United States Patent
Nakayama et al.

(10) Patent No.: US 11,353,410 B2
(45) Date of Patent: Jun. 7, 2022

(54) MATERIAL TESTING MACHINE AND RADIATION CT DEVICE

(71) Applicant: SHIMADZU TECHNO-RESEARCH, INC., Kyoto (JP)

(72) Inventors: Takashi Nakayama, Kyoto (JP); Tomohide Daigen, Kyoto (JP); Nobuyoshi Tsumaki, Kyoto (JP)

(73) Assignee: SHIMADZU TECHNO-RESEARCH, INC., Kyoto (JP)

( * ) Notice: Subject to any disclaimer, the term of this patent is extended or adjusted under 35 U.S.C. 154(b) by 217 days.

(21) Appl. No.: 16/568,881

(22) Filed: Sep. 12, 2019

(65) Prior Publication Data
US 2020/0088655 A1    Mar. 19, 2020

(30) Foreign Application Priority Data

Sep. 14, 2018   (JP) .............................. JP2018-172730

(51) Int. Cl.
*G01N 23/04*      (2018.01)
*G01N 23/046*     (2018.01)
(Continued)

(52) U.S. Cl.
CPC ........... *G01N 23/046* (2013.01); *G01N 23/04* (2013.01); *G01N 23/083* (2013.01);
(Continued)

(58) Field of Classification Search
CPC ...... G01N 23/04; G01N 23/046; G01N 23/06; G01N 23/083; G01N 23/087; G01N 23/18
(Continued)

(56) References Cited

U.S. PATENT DOCUMENTS

| 3,914,993 | A |   | 10/1975 | Babcock |          |
|-----------|---|---|---------|---------|----------|
| 4,422,177 | A | * | 12/1983 | Mastronardi | .......... G01N 23/18 378/17 |

(Continued)

FOREIGN PATENT DOCUMENTS

| CN | 105866006 A | 8/2016 |
| CN | 105928805 A | 9/2016 |

(Continued)

OTHER PUBLICATIONS

English translation of JP 2017-32325 A by Patent Translate.*

(Continued)

*Primary Examiner* — Allen C. Ho
(74) *Attorney, Agent, or Firm* — Sughrue Mion, PLLC

(57) ABSTRACT

A grip portion configured to support a test piece is disposed at a central part of a base, and a plurality of pillars are erected on the base. A disposition and number of the plurality of pillars are adjusted so that an X-ray emitted from an X-ray source and transmitting through the test piece transmits through zero or one pillar in an optional image capturing direction. It is possible to avoid a situation in which an attenuation rate of the X-ray largely differs due to a difference in an image capturing direction to the test piece. Thus, it is possible to prevent a strong artifact from overlapping a CT image of the test piece in an X-ray CT image. Moreover, a material testing machine is supported by the plurality of pillars to have an accessible state around the test piece. This configuration facilitates handling of the material testing machine.

11 Claims, 12 Drawing Sheets

(51) Int. Cl.
*G01N 23/06* (2018.01)
*G01N 23/083* (2018.01)
*G01N 23/087* (2018.01)
*G01N 23/18* (2018.01)

(52) U.S. Cl.
CPC .......... *G01N 23/087* (2013.01); *G01N 23/18* (2013.01); *G01N 2223/307* (2013.01); *G01N 2223/309* (2013.01)

(58) Field of Classification Search
USPC .................. 378/10, 20, 51, 53, 54, 58, 57
See application file for complete search history.

(56) References Cited

U.S. PATENT DOCUMENTS

| | | | | |
|---|---|---|---|---|
| 4,691,332 A * | 9/1987 | Burstein | ............... | G01N 23/04 378/7 |
| 4,969,165 A * | 11/1990 | Bernardi | ............ | G01N 23/046 378/13 |
| 4,989,225 A * | 1/1991 | Gupta | ................ | G01N 23/046 378/10 |
| 5,023,895 A * | 6/1991 | McCroskey | ....... | G01N 23/046 378/10 |
| 5,228,071 A * | 7/1993 | Kamata | ............... | G01N 23/046 378/20 |
| 5,640,462 A * | 6/1997 | Sato | .................... | G01N 23/046 382/131 |
| 5,917,876 A * | 6/1999 | Fujii | ................... | G01M 17/028 378/4 |
| 6,104,776 A * | 8/2000 | Oikawa | ........... | G01N 23/20025 378/22 |
| 6,553,094 B1 * | 4/2003 | Bernardi | ............. | G01N 23/046 378/21 |
| 6,711,235 B2 * | 3/2004 | Galish | ................... | G21K 1/025 378/147 |
| 6,873,680 B2 * | 3/2005 | Jones | ................ | G01N 33/2045 378/58 |
| 6,909,768 B2 * | 6/2005 | Takagi | ..................... | G06T 7/73 378/4 |
| 7,016,465 B2 * | 3/2006 | Kamegawa | ......... | G01N 23/046 378/19 |
| 7,082,182 B2 * | 7/2006 | Zhou | ..................... | A61B 6/032 378/10 |
| 7,177,388 B2 * | 2/2007 | Takagi | .................. | G01N 23/046 378/20 |
| 7,245,692 B2 * | 7/2007 | Lu | ........................ | G01N 23/04 378/4 |
| 7,254,211 B2 * | 8/2007 | Hunt | ................... | G01N 23/046 378/20 |
| 7,286,630 B2 * | 10/2007 | Holt | ...................... | A61B 6/032 378/20 |
| 7,386,090 B2 * | 6/2008 | Schroeder | ............. | A61B 6/032 378/20 |
| 7,492,862 B2 * | 2/2009 | Bendahan | ............. | G01V 5/0041 378/195 |
| 7,551,714 B2 * | 6/2009 | Rothschild | .......... | G01N 23/046 378/44 |
| 7,714,304 B2 * | 5/2010 | Poglitsch | ............ | G01N 23/046 250/491.1 |
| 7,760,852 B2 * | 7/2010 | Chen | .................... | A61B 6/032 378/19 |
| 7,792,242 B2 * | 9/2010 | Kamegawa | ......... | G01N 23/046 378/20 |
| 7,813,470 B2 * | 10/2010 | Kuwabara | ............ | G01N 23/087 378/4 |
| 8,068,579 B1 * | 11/2011 | Yun | .................... | G01N 23/046 378/21 |
| 8,121,247 B2 * | 2/2012 | Kunzmann | .......... | G01N 23/046 378/4 |
| 8,422,624 B2 * | 4/2013 | Christoph | ............ | G01N 23/046 378/4 |
| 8,764,290 B2 * | 7/2014 | O'Hare | .................. | A61B 6/583 378/207 |
| 8,938,111 B2 * | 1/2015 | Kingston | .............. | G01N 23/046 382/131 |
| 9,128,584 B2 * | 9/2015 | Case | ...................... | G06K 9/6212 |
| 9,953,799 B2 * | 4/2018 | Hakoda | ................. | H05G 1/02 |
| 10,031,091 B2 * | 7/2018 | Diehm | ................. | G01N 23/046 |
| 10,169,865 B2 * | 1/2019 | Case | ..................... | G06V 10/25 |
| 10,175,182 B2 * | 1/2019 | Xiao | .................... | G01N 23/046 |
| 10,190,996 B2 * | 1/2019 | Matsumiya | .......... | G01N 23/046 |
| 10,190,997 B2 * | 1/2019 | Aoki | ...................... | G05B 15/02 |
| 10,209,204 B2 * | 2/2019 | Mecke | ................ | G01N 23/046 |
| 10,247,682 B2 * | 4/2019 | Schlecht | ................ | A61B 6/032 |
| 10,393,678 B2 * | 8/2019 | Watanabe | ............ | G01V 5/0016 |
| 10,413,259 B2 * | 9/2019 | Schlecht | .............. | A61B 6/4208 |
| 10,514,343 B2 * | 12/2019 | Thompson | ........... | G01N 23/046 |
| 10,520,453 B2 * | 12/2019 | Monkawa | ............ | G01N 23/046 |
| 10,545,102 B2 * | 1/2020 | Takahashi | ............ | G01B 21/042 |
| 10,557,706 B2 * | 2/2020 | Machii | ................. | G01N 23/046 |
| 10,585,051 B2 * | 3/2020 | O'Hare | .................... | G01B 3/30 |
| 10,627,353 B2 * | 4/2020 | Kinoshita | ............. | G01N 23/04 |
| 10,645,788 B2 * | 5/2020 | Endo | ........................ | H05G 1/32 |
| 10,705,030 B2 * | 7/2020 | Watanabe | ............... | H01J 35/08 |
| 10,724,971 B2 * | 7/2020 | Harada | ................ | A61B 5/7435 |
| 10,753,887 B2 * | 8/2020 | Ariga | ................... | G01N 23/046 |
| 10,754,049 B2 * | 8/2020 | Sato | ........................ | H05G 1/26 |
| 10,799,198 B2 * | 10/2020 | Ahn | ....................... | A61B 6/542 |
| 10,801,972 B2 * | 10/2020 | Wuestenbecker | ..... | G01T 1/2914 |
| 10,803,574 B2 * | 10/2020 | Kirschenman | ....... | G01N 23/223 |
| 10,809,208 B2 * | 10/2020 | Yashima | ................ | G01B 15/04 |
| 10,859,515 B2 * | 12/2020 | Huang | ................. | G01N 23/087 |
| 10,900,777 B2 * | 1/2021 | Christoph | ............. | G01B 5/008 |
| 10,902,649 B2 * | 1/2021 | Chinomi | ............. | G01N 23/046 |
| 10,996,355 B2 * | 5/2021 | Kimmig | ................. | G01T 1/16 |
| 11,002,690 B2 * | 5/2021 | Niizaka | ................ | G01N 23/046 |
| 11,009,449 B2 * | 5/2021 | Myers | ..................... | G01N 21/17 |
| 11,009,471 B2 * | 5/2021 | Muehlhauser | ....... | G01N 23/046 |
| 11,016,038 B2 * | 5/2021 | Machii | ................... | G01N 23/04 |
| 11,020,071 B2 * | 6/2021 | Sa | ........................ | A61B 6/4435 |
| 11,037,337 B2 * | 6/2021 | Ariga | ................... | G06T 11/005 |
| 11,138,767 B2 * | 10/2021 | Andrew | ................ | G01N 23/046 |
| 11,175,242 B2 * | 11/2021 | Kingston | ............. | G01N 23/046 |

FOREIGN PATENT DOCUMENTS

| | | | | |
|---|---|---|---|---|
| CN | 107014841 A | 8/2017 | | |
| JP | 5-223756 | 8/1993 | | |
| JP | 2005-195414 A | 7/2005 | | |
| JP | 4059197 B2 * | 3/2008 | ............ | G01N 23/04 |
| JP | 2017-032325 A | 2/2017 | | |
| JP | 6424763 B2 * | 11/2018 | ............ | G01N 23/04 |
| WO | WO 2008/083993 A1 * | 7/2008 | ............ | G01N 23/04 |

OTHER PUBLICATIONS

English translation of WO 2008/083993 A1 by Patent Translate.*
English translation of JP 2005-195414 A by Patent Translate.*
Communication dated Feb. 17, 2020, from the European Patent Office in European Application No. 19182905.0.
Elisa Adorni et al., "In situ characterization of archaeological adobe bricks", Construction and Building Materials, Nov. 30, 2012, vol. 40, pp. 1-9 (9 pages total).
Notice of Reasons for Refusal dated Oct. 5, 2021 from the Japanese Patent Office in JP Application No. 2018-172730.
Communication dated Dec. 31, 2021 from the Chinese Patent Office in Chinese Application No. 201910822559.5.

* cited by examiner

X-RAY CT IMAGE     PATTERN DIAGRAM

MATERIAL TESTING MACHINE AND RADIATION CT DEVICE

BACKGROUND

Technical Field

The present invention relates to a material tester and a radiation CT apparatus capable of applying a load to a test piece and irradiating the test piece with radiation under the loaded condition to observe a radiation CT image of the test piece.

Related Art

In a material test of applying a load such as a tensile load, a compression load, a bending load, or a piercing load to a test piece to examine a property such as the strength of a material, X-ray fluoroscopy or X-ray CT image capturing is performed to observe the internal status of the test piece in some cases. As illustrated in FIG. 11, an X-ray CT device used for such a material test includes a rotary stage 103 between an X-ray source 101 and an X-ray detector 102, and a material testing machine 105 on which a test piece TP is disposed is placed on the rotary stage 103. A three-dimensional structure inside the test piece TP can be observed by executing X-ray fluoroscopy while rotating the rotary stage 103 about an axis denoted by reference sign G (for example, Japanese Patent Laid-open No. 2017-032325 and Japanese Patent Laid-open No. 2005-195414).

Conventional configurations of the material testing machine 105 are, for example, a configuration illustrated in FIG. 12A and a configuration illustrated in FIG. 12B. In a first conventional example illustrated in FIG. 12A, the material testing machine 105 includes a base 107, a pair of grips 109 disposed at the center of the base 107, a pair of pillars 111 erected on the base 107 so that the pair of pillars 111 are bilaterally symmetric across the pair of grips 109, a crosshead 113 mounted above the pair of pillars 111, and a drive mechanism 115 configured to reciprocally move one of the pair of grips 109 in the vertical direction (for example, FIG. 5 in Japanese Patent Laid-open No. 2005-195414).

The pair of grips 109 are disposed opposite to each other and hold both end parts of the test piece TP. As the one of the pair of grips 109 moves in the vertical direction while the pair of grips 109 hold the test piece TP, a compression load, a tensile load, or the like is added to the test piece TP. The pair of pillars 111 are made of a material such as metal having a high stiffness, and support between the base 107 and the crosshead 113.

The configuration of a material testing machine 105a according to a second conventional example illustrated in FIG. 12B is identical to that of the first conventional example illustrated in FIG. 12A except that a cylindrical member 121 is provided in place of the pair of pillars 111 (for example, FIGS. 1 and 2 in Japanese Patent Laid-open No. 2005-195414). The cylindrical member 121 is disposed surrounding the pair of grips 109 and the test piece TP, and made of a material having high X-ray transmittivity, such as transparent resin or carbon fiber reinforcement plastic (CFRP). Similarly to the pair of pillars 111, the cylindrical member 121 supports between the base 107 and the crosshead 113 to prevent deformation of the material testing machine 105 attributable to load application on the test piece TP.

SUMMARY

However, each conventional example having such a configuration has problems as follows.

First, when X-ray CT image capturing is performed by using the material testing machine 105 according to the first conventional example, a strong artifact occurs to an X-ray CT image of the test piece TP. Thus, it is extremely difficult to accurately perform internal observation of the test piece TP.

As a result of intensive studies of the cause of such a problem, the inventor has reached the following hypothesis. Specifically, when an X-ray is emitted while a rotary stage 103 on which the material testing machine 105 is placed is rotated, the pair of pillars 111 hinder X-ray CT image capturing, depending on the angle. For example, when the X-ray source 101, the X-ray detector 102, and the pair of pillars 111 are disposed in plan view as illustrated in FIG. 13A, the pair of pillars 111 do not block an X-ray 104 emitted from the X-ray source 101 and transmitting through the test piece TP.

However, when the rotary stage 103 is further rotated by 90° approximately to disposition as illustrated in FIG. 13B, the pair of pillars 111 each block the X-ray 104. The pair of pillars 111 are typically made of thick metal bars to withstand a load applied to the test piece TP, and thus the X-ray 104 largely attenuates due to transmission through the pair of pillars 111.

To observe an X-ray CT image, it is typical to intermittently perform X-ray image capturing while the rotary stage 103 is rotated by 180° or more, and thus part of X-ray image capturing data obtained at various image capturing angles is affected by a strong attenuation effect of the X-ray 104 due to transmission through the pair of two pillars 111, but the remaining X-ray image capturing data is not affected by the pair of pillars 111. As a result, it is thought that an artifact attributable to difference in the attenuation effect occurs in a reconstructed X-ray CT image.

In the material testing machine 105a according to the second conventional example, the test piece TP is surrounded by the cylindrical member 121 having a constant thickness as illustrated in FIG. 13C. The cylindrical member 121 is made of a relatively thin material having high X-ray transmittivity. Thus, when X-ray CT image capturing is performed by using the material testing machine 105a, a difference in the X-ray attenuation effect due to a difference in the image capturing angle is extremely small, and thus it is thought that the artifact influence on an X-ray CT image is small.

However, it is concerned that the material testing machine 105a is limited in the contents of a material test and has low versatility, and an operation for performing the material test is complicated and time-consuming. Specifically, in the material testing machine 105a, a test space in which the test piece TP is disposed is closed by the cylindrical member 121 and extremely small.

Thus, a space in which various sensors such as an extensometer and a load cell and various wires can be disposed around the test piece is limited to the inside of the cylindrical member 121. Thus, it is difficult to obtain many kinds of data in a single material test, and work of disposing sensors and wires around the test piece TP is complicated. Furthermore, since the test space is small and closed, usable test pieces are limited to extremely small ones, and it is difficult to perform a material test by using the test piece TP having a shape and a size conforming to a standard such as JIS standard or ISO standard.

In addition, since the periphery of the test piece TP is closed by the cylindrical member 121, various components such as the cylindrical member 121 and the crosshead 113 need to be removed and the material testing machine 105a need to be disassembled each time the material test ends, or the test piece TP cannot be taken out. Then, to perform the material test again, it is needed to perform complicated work of assembling the material testing machine 105a while keeping constant the distance between the pair of grips 109 holding the test piece TP. As a result, the material test will take an enormous amount of time.

Furthermore, to reduce the X-ray attenuation effect by the cylindrical member 121, the cylindrical member 121 needs to be made of a thin material having high X-ray transmissivity. However, since it is difficult to ensure sufficient strength with the cylindrical member 121 having such a configuration, the material testing machine 105a is likely to deform due to a load. Thus, it is also concerned that the upper limit of the magnitude of a load that can be applied to the test piece is low in the material testing machine 105a.

The present invention has been made in view of such circumstances, and it is an object of the present invention to provide a material testing machine and a radiation CT device that are capable of executing a material test easily and in a short time and improving the accuracy of a radiation CT image obtained by radiation CT image capturing in the material test.

To achieve the above-described object, the present invention has a configuration as follows.

Specifically, a material testing machine according to the present invention is a material testing machine placed on a rotary stage disposed between a radiation source and a radiation detector disposed opposite to each other. The material testing machine includes: a base; a first member disposed at a center of the base and configured to support a test piece; a second member disposed opposite to the first member across the test piece; a plurality of pillars erected on the base; and a drive mechanism configured to drive at least one of the first member and the second member in a direction in which a load is applied to the test piece. When radiation CT image capturing is performed while rotating the rotary stage about an axis orthogonal to a surface of the rotary stage, the pillars are erected so that a number of pillars through which radiation emitted from the radiation source, transmitting through the test piece, and detected by the radiation detector transmits before being detected by the radiation detector is equal to or smaller than one when the test piece is irradiated with radiation in an optional direction.

[Effects] In the material testing machine according to the present invention, the first member configured to support the test piece is disposed at the center of the base. The plurality of pillars are erected on the base so that the number of pillars through which radiation emitted from the radiation source, transmitting through the test piece, and detected by the radiation detector transmits before being detected by the radiation detector is equal to or smaller than one.

When the pillars are erected in this manner, radiation transmitting through the test piece and detected by the radiation detector does not largely attenuate through two or more pillars while the test piece is irradiated with an X-ray in any direction. When the test piece is irradiated with radiation while the rotary stage on which the material testing machine is placed is rotated, it is possible to avoid a situation in which the attenuation rate of radiation largely differs due to difference in the angle of radiation irradiation of the test piece. As a result, it is possible to avoid a situation in which a strong artifact occurs to a CT image of the test piece in a radiation CT image, thereby improving the accuracy of three-dimensional observation using the radiation CT image.

Since the plurality of pillars are erected on the base, it is possible to have an open space around the test piece due to the gap between the pillars while improving the strength of the material testing machine by the pillars. Thus, work of setting the test piece to the material testing machine and work of removing the test piece can be easily performed by putting a hand or the like through the gap between the pillars. In addition, a range in which the test piece and sensors are installed can be significantly increased as compared to a conventional configuration in which the test piece is set in a space closed by a tubular member or the like. Thus, material test can be performed under more various kinds of conditions, and the quality of data obtained through the material test can be improved.

To achieve the above-described object, the present invention may have another configuration as follows.

Specifically, the material testing machine according to the present invention includes: a base; a first member disposed at a center of the base and configured to support a test piece; a second member disposed opposite to the first member across the test piece; a plurality of pillars erected on the base; and a drive mechanism configured to drive at least one of the first member and the second member in a direction in which a load is applied to the test piece. The pillars are erected so that a region formed by each straight line passing through optional two of the pillars does not overlap the test piece.

[Effects] In the material testing machine according to the present invention, the first member configured to support the test piece is disposed at the center of the base. The pillars are erected so that a region formed by each straight line passing through optional two of the pillars does not overlap the test piece.

When radiation CT image capturing is performed by using a material testing machine in which pillars are erected, a thick linear artifact occurs in a region formed by each straight line passing through optional two of the pillars. When the pillars are erected in this manner, it is possible to reliably prevent a thick linear artifact from overlapping a radiation CT image of the test piece in a radiation CT image. Thus, it is possible to excellently avoid a situation in which the accuracy of three-dimensional observation using the radiation CT image of the test piece decreases attributable to a thick linear artifact.

Since the plurality of pillars are erected on the base, it is possible to have an open space around the test piece due to the gap between the pillars while improving the strength of the material testing machine by the pillars. Thus, it is possible to avoid complexity of work such as setting of the test piece to the material testing machine. In addition, a range in which the test piece and sensors are installed can be significantly increased. Thus, material test can be performed under more various kinds of conditions, and the quality of data obtained through the material test can be improved.

In the above-described invention, it is preferable that each of the pillars be erected at a position corresponding to an apex of a regular polygon having an odd number of apexes and centered at the first member.

[Effects] In the material testing machine according to the present invention, each pillar is erected at a position corresponding to an apex of a regular polygon having an odd number of apexes and centered at the first member. In this case, a load applied to the test piece is equally dispersed through the pillars. Thus, it is possible to excellently avoid decrease of the durability of the material testing machine attributable to imbalance of the load.

In the above-described invention, it is preferable that:

$$S1 \cdot \cos\{\pi \cdot (n-1)/2n\} \geq S2 + S3 \qquad \text{[Expression 1]}$$

holds, where n represents the number of pillars, S1 represents a distance between a center of each of the pillars and a center of the first member, S2 represents a radius of each of the pillars, and S3 represents a maximum distance between the center of the first member and the test piece.

[Effects] In the material testing machine according to the present invention having the configuration in which each pillar is erected at a position corresponding to an apex of a regular polygon having an odd number of apexes and centered at the first member, it is possible to reliably avoid a situation in which a thick linear artifact occurring in a radiation CT image overlaps the radiation CT image of the test piece. Thus, it is possible to excellently avoid a situation in which the accuracy of three-dimensional observation of the test piece using the radiation CT image decreases.

In the above-described invention, it is preferable that each of the pillars be erected at a position corresponding to an apex of a regular triangle centered at the first member.

[Effects] In the material testing machine according to the present invention, each pillar is erected at a position corresponding to an apex of a regular triangle centered at the first member. In this case, a load applied to the test piece can be equally dispersed through a reduced number of pillars. This improves the durability of the material testing machine and facilitates simplification and downsizing of the material testing machine. Through the downsizing of the material testing machine, it is possible to shorten the length between an X-ray source and the test piece in an optical axis direction at radiation CT image capturing, thereby improving the accuracy of three-dimensional observation through acquisition of a radiation CT image at a higher magnification.

In the above-described invention, it is preferable that:

$$S1-(1/2)S2 \geq S2+S3 \qquad \text{[Expression 2]}$$

holds, where S1 represents a distance between a center of each of the pillars and a center of the first member, S2 represents a radius of each of the pillars, and S3 represents a maximum distance between the center of the first member and the test piece.

[Effects] In the material testing machine according to the present invention having the configuration in which each pillar is erected at a position corresponding to an apex of a regular triangle centered at the first member, it is possible to reliably avoid a situation in which a thick linear artifact occurring in a radiation CT image overlaps an X-ray CT image of the test piece. Thus, it is possible to excellently avoid a situation in which the accuracy of three-dimensional observation using the radiation CT image of the test piece decreases.

It is preferable that a radiation CT device include: a radiation source configured to irradiate a test piece with radiation; a radiation detector configured to detect the radiation having transmitted through the test piece and output a radiation detection signal; a rotation table that is disposed between the radiation source and the radiation detector and on which a material testing machine supporting the test piece is placed; a rotation mechanism configured to rotate the rotation table; a radiation irradiation control unit configured to cause the radiation source to repeat radiation irradiation while the rotation table is rotated; and a reconstruction processing unit configured to reconstruct a radiation CT image of the test piece based on the radiation detection signal output from the radiation detector each time the radiation source performs the radiation irradiation, and the material testing machine is the material testing machine according to above-described invention. The radiation CT device according to the present invention can provide the effects of the above-described material testing machine.

In a material testing machine and a radiation CT device according to the present invention, when a test piece is irradiated with radiation in an optional direction, a plurality of pillars are erected on a base of the material testing machine so that the number of pillars through which radiation transmitting through the test piece and detected by a radiation detector transmits before being detected by the radiation detector is equal to or smaller than one. In this case, since the radiation transmits zero or one pillar in any image capturing direction to the test piece, it is possible to prevent a situation in which the radiation largely attenuates due to transmission through two or more pillars only in a particular image capturing direction when a radiation CT image is captured. Thus, it is possible to avoid an artifact occurring to the radiation CT image of the test piece attributable to variation of X-ray image data due to difference in the image capturing direction, thereby improving the accuracy of three-dimensional observation using the radiation CT image.

In addition, it is possible to have an open space around the test piece due to the gap between the plurality of pillars while improving the durability of the material testing machine against a load by erecting the pillars. Thus, work of attaching the test piece to the material testing machine and work of removing the test piece can be easily performed by putting a hand or the like closer to the central part of the material testing machine through the gap between the pillars without disassembling the material testing machine. Thus, the complexity of work performed in the material test can be significantly reduced.

BRIEF DESCRIPTION OF DRAWINGS

FIG. 2A is a perspective view of the material testing machine, FIG. 2B is a perspective view illustrating a main part of a drive mechanism, and FIG. 2C is a front view of the material testing machine;

FIG. 3A is a diagram illustrating an initial state, FIG. 3B is a diagram illustrating a state rotated from the initial state by 30°, and FIG. 3C is a diagram illustrating a state rotated from the initial state by 60°;

FIG. 5A illustrates an X-ray CT image captured by using a material testing machine including no pillars and a pattern diagram thereof, FIG. 5B illustrates an X-ray CT image captured by using a material testing machine according to a first conventional example and a pattern diagram thereof, and FIG. 5C illustrates an X-ray CT image captured by using the material testing machine according to the embodiment and a pattern diagram thereof;

FIG. 6A is a schematic diagram for description of a region in which thick linear artifacts occur in an X-ray CT image, FIG. 6B is a transverse sectional view exemplarily illustrating the positional relation among the CT image capturing region and pillars with which no artifacts overlap a CT image of a test piece, and FIG. 6C is a transverse sectional view exemplarily illustrating the positional relation among the CT image capturing region and pillars with which artifacts overlap the CT image of the test piece;

FIG. 8A is a transverse sectional view illustrating a modification in which four pillars are erected, FIG. 8B is a transverse sectional view illustrating the positional relation between a region K and the CT image capturing region when the four pillars are erected, FIG. 8C is a transverse sectional view illustrating a modification in which five pillars are erected in a regular pentagonal shape, and FIG. 8D is a transverse sectional view illustrating the positional relation between the region K and the CT image capturing region when the pillars are erected in the regular pentagonal shape;

FIG. 9A is a transverse sectional view illustrating a region K1 closest to the CT image capturing region in the region K, and FIG. 9B is a diagram illustrating a condition under which the region K and the CT image capturing region do not overlap;

FIG. 10A is a perspective view, FIG. 10B is a side view illustrating a state in which no load is applied, and FIG. 10C is a side view illustrating a state in which a bending load is applied;

FIG. 12A is a perspective view for description of the configuration of a material testing machine in a first conventional example, and FIG. 12B is a perspective view for description of the configuration of a material testing machine in a second conventional example;

FIG. 13A is a transverse sectional view illustrating a state in which an X-ray is not blocked by pillars in the first conventional example, FIG. 13B is a transverse sectional view illustrating a state in which an X-ray is blocked by the pillars in the first conventional example, and FIG. 13C is a transverse sectional view of the material testing machine according to the second conventional example.

DETAILED DESCRIPTION

Figure 1:
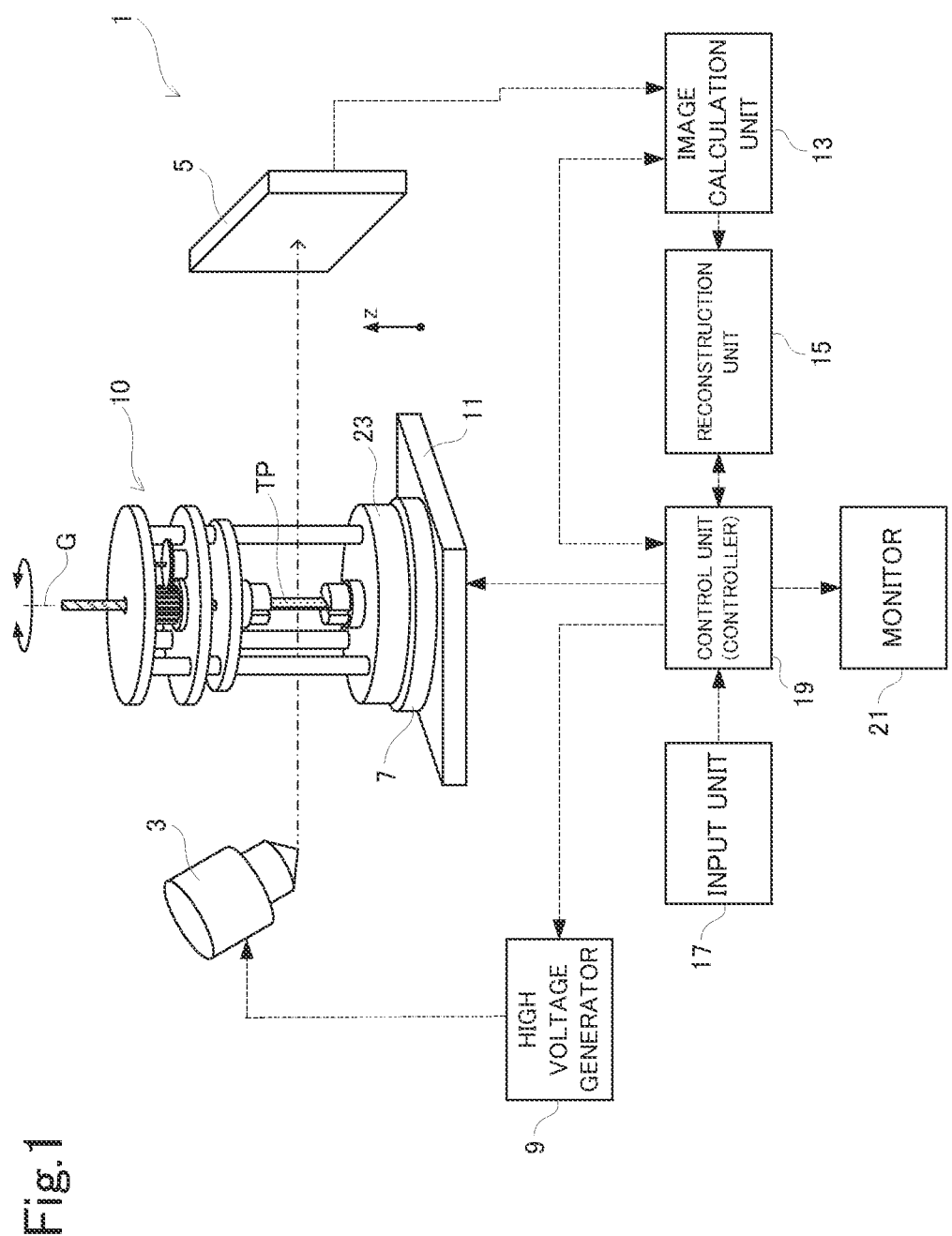
FIG. 1 is a perspective view illustrating an entire configuration of an X-ray CT device including a material testing machine according to an embodiment.

The following describes an embodiment of the present invention with reference to the accompanying drawings. The present embodiment exemplarily illustrates an X-ray CT device as an exemplary radiation CT device. FIG. 1 is a schematic diagram of an X-ray CT device 1 to which a material testing machine 10 according to the embodiment is applied. The present embodiment exemplarily describes a case in which a material test is performed by applying a tensile load to a test piece TP.

<Description of Entire Configuration>

The X-ray CT device 1 includes an X-ray source 3, an X-ray detector 5, a rotary stage 7, and a high voltage generator 9. The X-ray source 3 and the X-ray detector 5 are disposed opposite to each other across the rotary stage 7. The rotary stage 7 is disposed between the X-ray source 3 and the X-ray detector 5 and rotatable about an axis orthogonal to the surface of the rotary stage 7. The rotary stage 7 rotates about an axis in a z direction denoted by reference sign G. It is possible to perform non-destructive internal observation of the test piece TP held by the material testing machine 10 by placing the material testing machine 10 on the rotary stage 7.

When applied with high voltage from the high voltage generator 9, the X-ray source 3 irradiates the test piece TP with an X-ray. The X-ray detector 5 detects an X-ray emitted from the X-ray source 3 to the test piece TP and transmitting through the test piece TP, converts the X-ray into an electric signal, and outputs the electric signal as an X-ray detection signal. The X-ray detector 5 is, for example, a flat panel detector (FPD). In the present embodiment, an x direction is defined to be a direction connecting the center of the X-ray source 3 and the center of the X-ray detector 5.

The X-ray CT device 1 further includes a stage drive mechanism 11, an image calculation unit 13, a reconstruction unit 15, an input unit 17, a control unit (controller) 19, and a monitor 21. The stage drive mechanism 11 moves a rotary stage 7 in the x, y, and z directions orthogonal to each other. The image calculation unit 13 is provided downstream of the X-ray detector 5, and generates X-ray image data (two-dimensional image data) by performing calculation based on the X-ray detection signal output from the X-ray detector 5.

The reconstruction unit 15 is provided downstream of the image calculation unit 13, and reconstructs a cross-sectional image (X-ray CT image) of the test piece TP by using the X-ray image data generated by the image calculation unit 13. Specifically, the X-ray source 3 intermittently emits the X ray to the test piece TP while the rotary stage 7 is rotated about an axis G in the z direction. Then, the X-ray CT image of the test piece TP sliced along an xy plane is acquired by reconstructing the X-ray image data of the test piece TP generated for 360° at each minute rotation angle. In addition, the reconstruction unit 15 reconstructs a three-dimensional image by using the X-ray image data for 360°.

The input unit 17 receives inputting of an instruction from an operator, and is, for example, a keyboard input panel or a touch input panel. The control unit 19 includes a central processing unit (CPU) and the like, and collectively controls various operations of the high voltage generator 9, the stage drive mechanism 11, the image calculation unit 13, the reconstruction unit 15, the monitor 21, and the like in accordance with information or the like input to the input unit 17. The monitor 21 displays the X-ray image data generated by the image calculation unit 13, the X-ray CT image and the three-dimensional image reconstructed by the reconstruction unit 15, and the like.

<Configuration of Material Testing Machine>

Figure 2A:
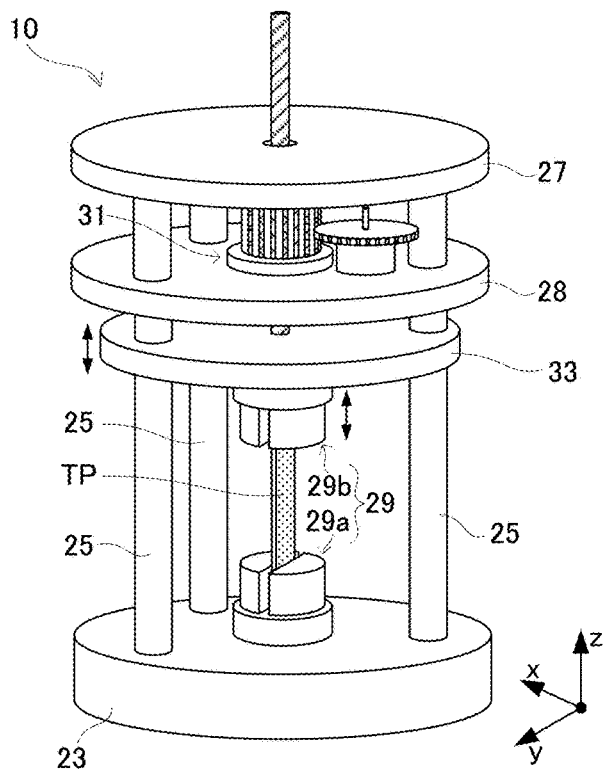
FIGS. 2A, 2B, and 2C are diagrams illustrating the configuration of the material testing machine according to the embodiment.
Figure 2B:
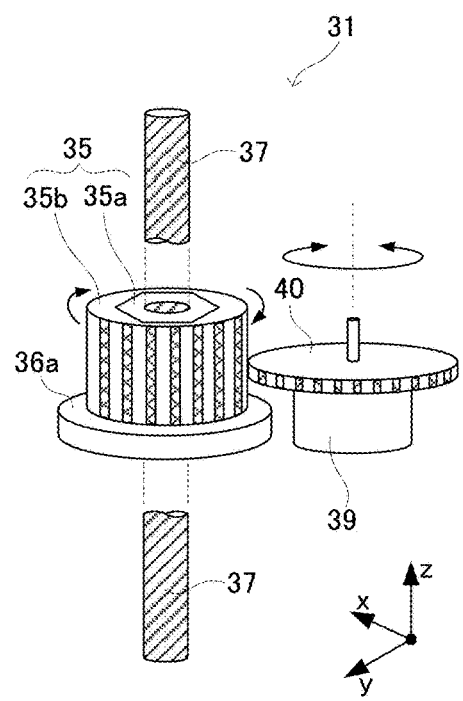

The following describes the configuration of the material testing machine 10 according to the embodiment. FIG. 2A is a perspective view of the material testing machine 10, and FIG. 2B is a longitudinal sectional view of the material testing machine 10.

The material testing machine 10 includes a base 23, a plurality of pillars 25, a crosshead 27, a crosshead 28, a pair of grips 29, a drive mechanism 31, and a movable head 33. The pillars 25 are erected on the base 23. The crosshead 27 and the crosshead 28 are mounted on the pillars 25. The crosshead 27 is mounted on an upper end of each pillar 25, and the crosshead 28 is mounted on the pillars 25 slightly below the crosshead 27. Each pillar 25 supports between the base 23 and the crosshead 27.

The pillars 25 are made of a material such as metal having high stiffness. Deformation of the material testing machine 10 attributable to a load applied to the test piece TP is more reliably prevented by increasing the stiffness of the pillars 25. The material of the pillars 25 preferably has high X-ray transmittivity. The high X-ray transmittivity of the pillars 25 reduces attenuation of an X-ray when transmitting the pillars 25. The material having high stiffness and X-ray transmittivity is, for example, metal such as aluminum or CFRP.

The grips 29 are a lower grip 29a and an upper grip 29b. The lower grip 29a is disposed at the center of the base 23, and holds the lower end of the test piece TP. The upper grip 29b is provided above the lower grip 29a, and holds the upper end of the test piece TP. In other words, the test piece TP held by the grips 29 is disposed at the central part of the base 23. The lower grip 29a and the upper grip 29b are disposed at positions opposite to each other across the test piece TP.

The lower grip 29a and the upper grip 29b each include a base part 30 and a pair of holding units 32. The holding units 32 are each connected with the base part 30 and can be opened and closed. The test piece TP is held through change from an opened state in which the holding units 32 are separated from each other to a closed state in which the holding units 32 are close to each other.

The base part 30 and the holding units 32 included in the lower grip 29a are referred to as a base part 30a and holding units 32a, and the base part 30 and the holding units 32 included in the upper grip 29b are referred to as a base part 30b and holding units 32b. The base part 30a of the lower grip 29a is connected with the central part of the base 23, and the base part 30b of the upper grip 29b is fixed to the lower end of a screw rod 37 to be described later.

The upper grip 29b is reciprocally movable in the z direction by the drive mechanism 31. When the upper grip 29b moves upward in the z direction while the lower grip 29a and the upper grip 29b hold the test piece TP, a tensile load is applied to the test piece TP in the z direction. In the present modification, the lower grip 29a corresponds to a first member in the present invention, and the upper grip 29b corresponds to a second member in the present invention.

Figure 2C:
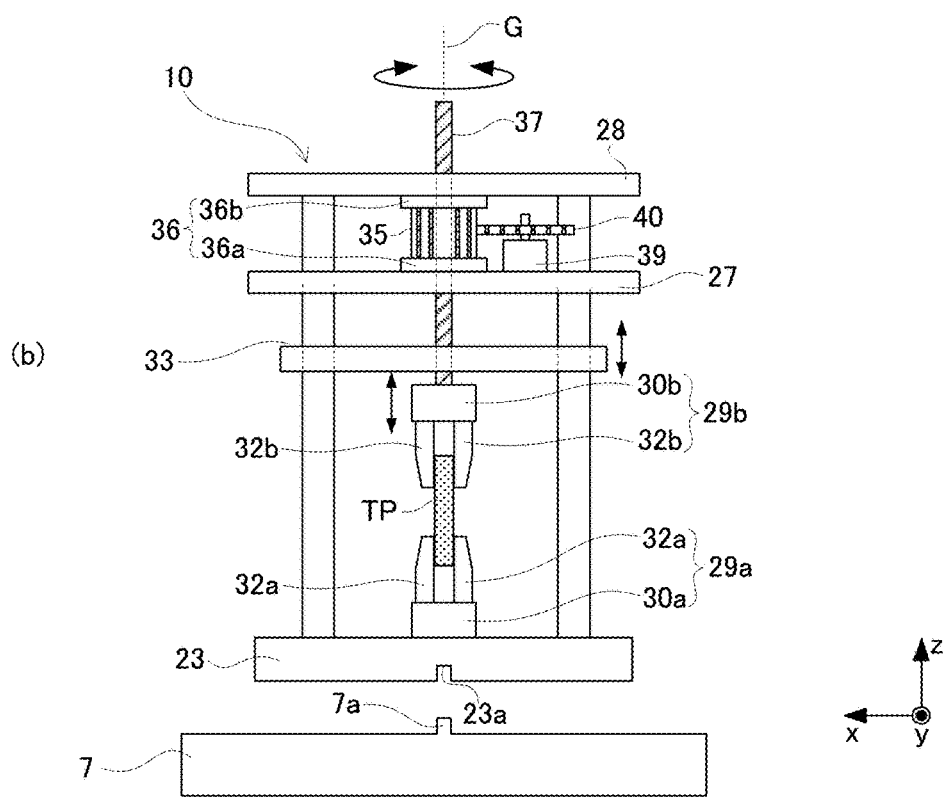

The following describes the configuration of the drive mechanism 31 with reference to FIGS. 2B and 2C. The drive mechanism 31 includes a rotation member 35, the screw rod 37, and a motor 39. The rotation member 35 is attached between the crosshead 27 and the crosshead 28. The screw rod 37 is screwed with the rotation member 35 and extends in the z direction through the crosshead 27 and the crosshead 28. The lower end of the screw rod 37 is integrally connected with the upper grip 29b.

The rotation member 35 includes a nut 35a and a gear 35b as illustrated in FIG. 2B. The nut 35a is internally threaded and screwed with the nut 35a and the screw rod 37. The gear 35b is provided outside the nut 35a and engaged with a gear 40 to be described later.

A pair of spacers 36 are attached above and below the rotation member 35. A spacer 36a as one of the spacers 36 is attached between the lower surface of the rotation member 35 and the upper surface of the crosshead 28, and a spacer 36b as the other spacer 36 is attached between the upper surface of the rotation member 35 and the lower surface of the crosshead 27. The rotation member 35 sandwiched between the spacers 36a and 36b is restricted not to move in the z direction, in other words, the vertical direction, and is rotatable about the axis in the z direction. In FIG. 2B, the spacer 36b is omitted for the purpose of illustration.

The motor 39 is disposed on the upper surface of the crosshead 28 and rotates the rotation member 35 about the axis in the z direction. Specifically, as illustrated in FIGS. 2B and 2C, the motor 39 is connected with the gear 40, and the gear 40 is disposed to engage with the gear 35b. The nut 35a and the gear 35b are integrated, and the gear 40 rotates in accordance with rotation of the motor 39. Accordingly, the rotational force of the motor 39 is transferred to the nut 35a through the gear 40 and the gear 35b, and the nut 35a rotates about the axis in the z direction when the motor 39 is rotated.

As the nut 35a rotates together with the gear 35b, drive power in the z direction occurs to the screw rod 37 screwed with the nut 35a. Specifically, as the nut 35a rotates, the screw rod 37 moves together with the upper grip 29b in the vertical direction along the rotation member 35. The configuration of the drive mechanism 31 according to the embodiment is exemplary, and may be changed as appropriate to a configuration in which a load can be applied to the test piece TP by moving at least one of the grips 29.

The movable head 33 is mounted on the pillars 25 between the base 23 and the crosshead 28. The movable head 33 is, for example, a metal circular disk, and provided with a through-hole through which each pillar 25 penetrates. Specifically, the movable head 33 is slidable in the z direction along the pillars 25 between the base 23 and the crosshead 28. The movable head 33 is fixed to the screw rod 37. Thus, the movable head 33 moves in the z direction together with the upper grip 29b as the rotation member 35 is rotated by the motor 39. Since the movable head 33 slides on the pillars 25, the position of the upper grip 29b moving in the z direction can be prevented from being displaced in the x direction or the y direction.

It is preferable that the base 23 be provided with a positioning member configured to prevent positional displacement of the material testing machine 10 placed on the rotation table 7. As illustrated in FIG. 2C, the positioning member in the embodiment includes a convex portion 7a provided at the central part of the upper surface of the rotation table 7, and a concave portion 23a provided at the central part of the lower surface of the base 23. The center of the base 23 can be reliably positioned to the center of the rotation table 7 through engagement of the concave portion 23a with the convex portion 7a when the material testing machine 10 is placed on the rotation table 7.

Figure 3A:
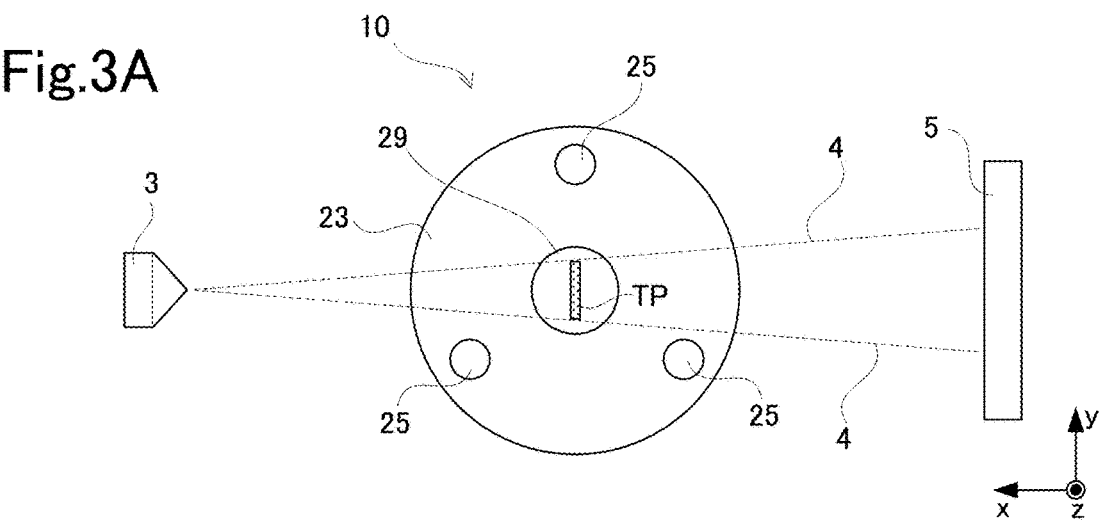
FIGS. 3A, 3B, and 3C are transverse sectional views illustrating characteristics of the material testing machine according to the embodiment.
Figure 3B:
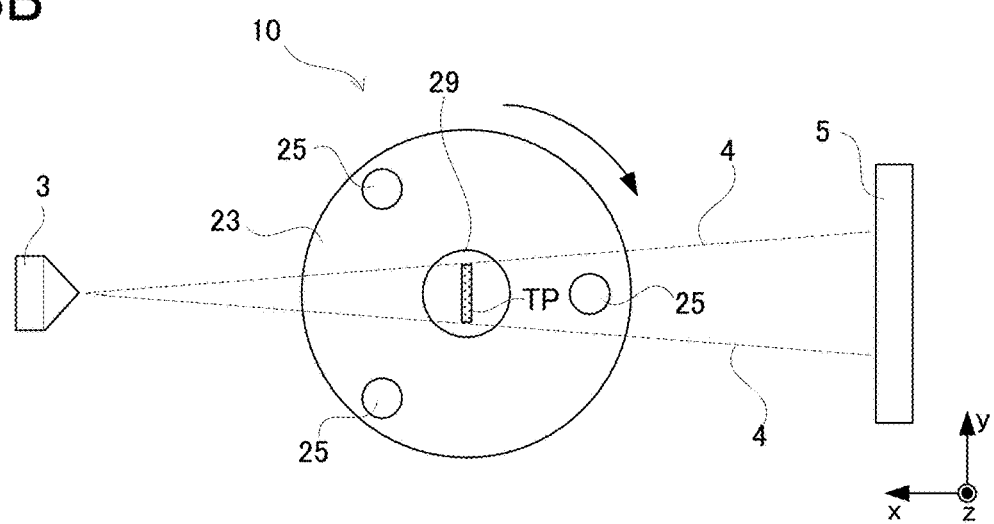
Figure 3C:
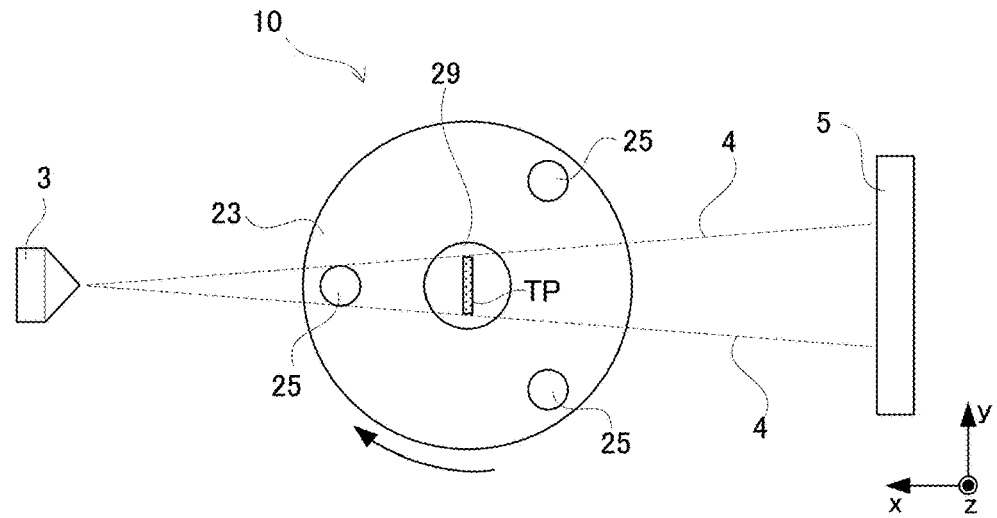

The following describes the configuration of the pillars 25 as a feature of the present invention with reference to FIGS. 3A, 3B, and 3C. The material testing machine 10 according to the embodiment is configured so that the number of pillars 25 through which an X-ray emitted from the X-ray source 3, transmitting through the test piece TP, and detected by the X-ray detector 5 transmits is equal to or smaller than one when the X-ray CT image is acquired. Hereinafter, the X-ray emitted from the X-ray source 3, transmitting through the test piece TP, and detected by the X-ray detector 5 is denoted by reference sign 4. Specifically, the number of pillars 25 through which the X-ray 4 transmits is equal to or smaller than one in an optional irradiation direction to the test piece TP.

In the present embodiment, the three pillars 25 are provided as illustrated in FIG. 3A. Each pillar 25 is erected at a position corresponding to an apex of a regular triangle centered at the grips 29. When the pillars 25 are displaced on the xy plane as the base 23 rotates together with the rotation table 7, the X-ray 4 transmits through none of the pillars 25 (FIG. 3A) or passes through only one of the pillars 25 (FIGS. 3B and 3C), irrespective of the magnitude of the rotation angle of the rotation table 7. With this configuration, it is possible to prevent the X-ray 4 from transmitting through two pillars and largely attenuating.

Figure 4:
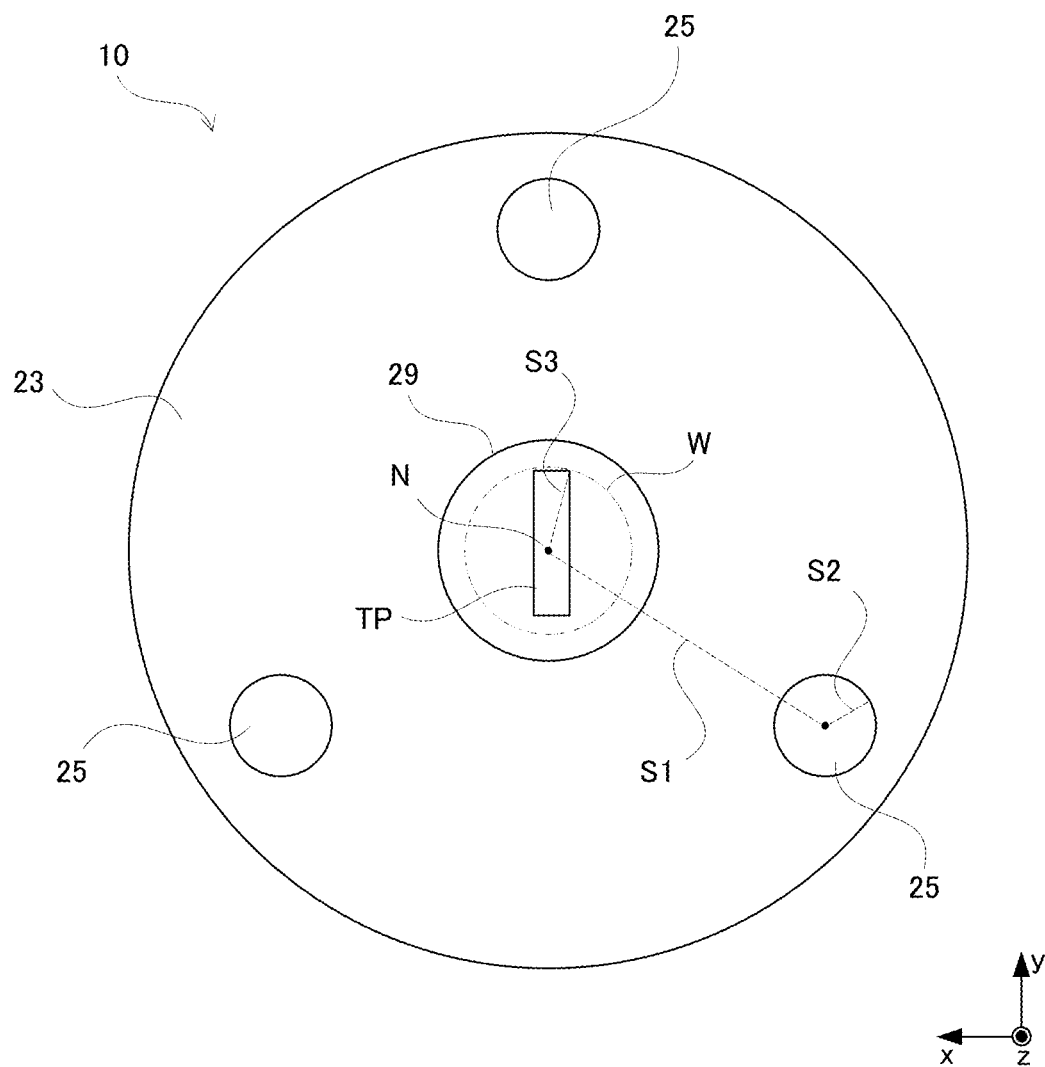
FIG. 4 is a transverse sectional view for description of a CT image capturing region of the material testing machine according to the embodiment.

The configuration as a feature of the present invention in which the number of pillars 25 through which the X-ray 4 transmits in an optional image capturing direction is equal to or smaller than one can be achieved by adjusting a length S1 between a center N of the grips 29 and a center M of each pillar 25, a radius S2 of each pillar 25, and a radius S3 of a CT image capturing region W to appropriate lengths. In the present embodiment, the CT image capturing region W means a region through which the test piece TP passes at X-ray CT image capturing. On the xy plane, a circle having a radius equal to a maximum distance S3 in the distance between the center N of the grips 29 and the test piece TP corresponds to the CT image capturing region W as illustrated in FIG. 4.

When the three pillars 25 are disposed in a regular triangular shape and the values of S1 to S3 satisfy Expression (1) below, the configuration in which the X-ray 4 transmits through at most one pillar 25 in an optional image capturing direction can be achieved.

$$S1 \cdot (1/2) \geq S2 + S3 \quad (1)$$

In other words, positions at which the pillars 25 are erected on the base 23, the thickness of each pillar 25, and the like are adjusted so that the sum of S2 and S3 is equal to or smaller than half of S1. Conditional expression (1) will be described later in detail.

<Description of Operation>

The following describes the operation of the X-ray CT device 1 according to the embodiment with reference to the accompanying drawings.

First, the test piece TP as a material test target is set to the material testing machine 10. Specifically, the holding units 32a of the lower grip 29a are opened to insert a lower end part of the test piece TP between the holding units 32a. Then, as the holding units 32a being opened is closed, the lower end part of the test piece TP is held by the lower grip 29a.

Then, as an upper end part of the test piece TP is inserted between the holding units 32b of the upper grip 29b and the holding units 32b being opened are closed, the upper end part of the test piece TP is held. Before or after the process in which the test piece TP is set to the material testing machine 10 by the grips 29, a sensor such as an extensometer, a strain gauge, a load cell, or a thermocouple, a wire connected with the sensor, and the like are set to peripheral parts of the test piece TP and the material testing machine 10.

After the test piece TP, the sensor, and the like are set to the material testing machine 10, the material testing machine 10 is placed on the rotation table 7. In this case, the material testing machine 10 is placed so that the center of the rotation table 7 coincides with the center N of the grips 29. In the embodiment, the center N of the grips 29 is reliably made coincide with the center of the rotation table 7 by engaging the concave portion 23a of the base 23 with the convex portion 7a of the rotation table 7.

Subsequently, the operation of applying a predetermined load to the test piece TP is performed. The operator actuates the drive mechanism 31 by using a controller (not illustrated) provided to the material testing machine 10. The motor 39 rotates the rotation member 35 upon the actuation of the drive mechanism 31, and the screw rod 37 moves in the z direction together with the movable head 33 and the upper grip 29b through the rotation of the rotation member 35. The position of the lower grip 29a supporting the lower end of the test piece TP is fixed.

Thus, as the upper grip 29b moves in a direction away from the lower grip 29a, a tensile load having a magnitude in accordance with the moving amount of the upper grip 29b acts on the test piece TP. The magnitude of the tensile load is detected by a load cell (not illustrated) disposed on the movable head 33 or the like. The amount of displacement of the test piece TP due to the load is detected by an extensometer (not illustrated).

After the motor 39 is actuated, X-ray CT image capturing is started while the load is applied to the test piece TP. Specifically, the operator inputs a predetermined X-ray irradiation condition to the input unit 17 so that an X-ray is intermittently emitted while the rotation table 7 is rotated. Through the rotation of the rotation table 7, the material testing machine 10 rotates about the axis in the z direction centered at the grips 29 holding the test piece TP. The high voltage generator 9 applies a tube voltage in accordance with the X-ray irradiation condition to the X-ray source 3, and an X-ray is emitted from the X-ray source 3. The emitted X-ray transmits through the test piece TP and is detected by the X-ray detector 5. The image calculation unit 13 generates X-ray image data of the test piece TP based on an X-ray detection signal transmitted from the X-ray detector 5 having detected the X-ray.

An X-ray is repeatedly emitted from the X-ray source 3 each time the rotation table 7 rotates by a predetermined minute angle, and accordingly, a large number of the X-ray image data of the test piece TP captured at various angles is generated. The reconstruction unit 15 reconstructs the group of the X-ray image data of the test piece TP generated for the respective image capturing angles, thereby generating an X-ray CT image of the test piece TP on an optional plane orthogonal to the z direction. The generated X-ray CT image is displayed on the monitor 21.

<Effects of Configuration According to Embodiment>

When X-ray CT image capturing is performed by emitting an X-ray while rotating the material testing machine 10, the X-ray 4 transmitting through the test piece TP and detected by the X-ray detector 5 transmits through at most one pillar 25 at an optional X-ray irradiation angle to the test piece TP. The X-ray 4 largely attenuates when the X-ray 4 transmits through two or more pillars 25, or the attenuation rate of the X-ray 4 is small when the X-ray 4 transmits through one pillar.

In the embodiment, the number of pillars 25 through the X-ray 4 transmits in an optional image capturing angle is zero or one, and never equal to or larger than two. Thus, it is possible to avoid large difference in the attenuation rate of the X-ray 4 due to difference in the image capturing angle to the test piece TP. As a result, an artifact occurring to a CT image of the test piece TP in the X-ray CT image reduces, thereby improving the accuracy of three-dimensional observation of the test piece TP by using the X-ray CT image.

Figure 5A:
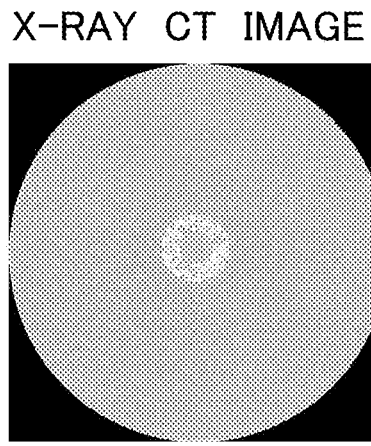
FIGS. 5A, 5B, and 5C are diagrams for description of effects of the material testing machine according to the embodiment.
Figure 5A:
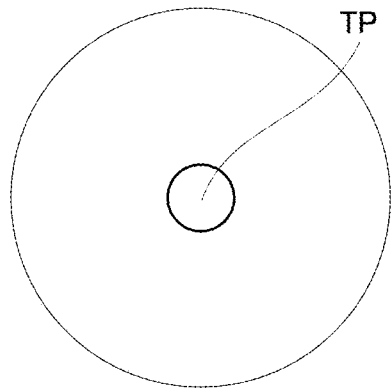
Figure 5B:
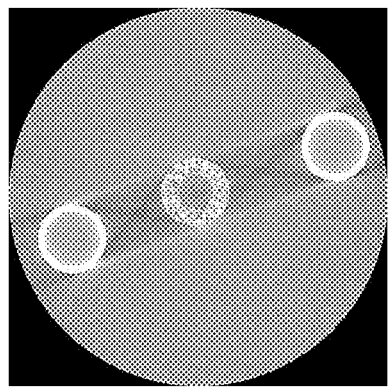
Figure 5B:
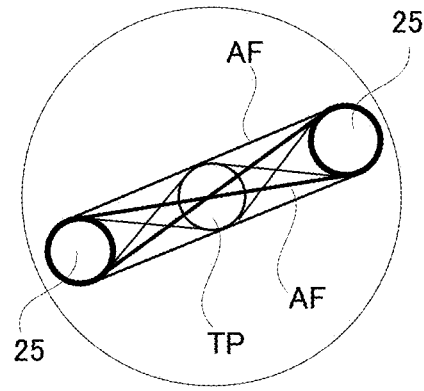
Figure 5C:
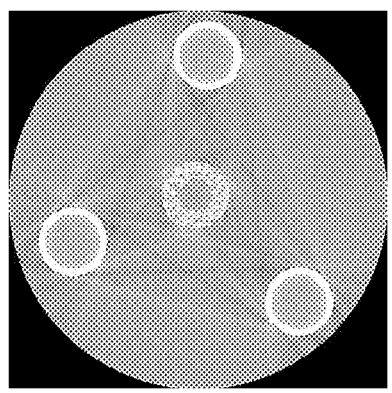
Figure 5C:
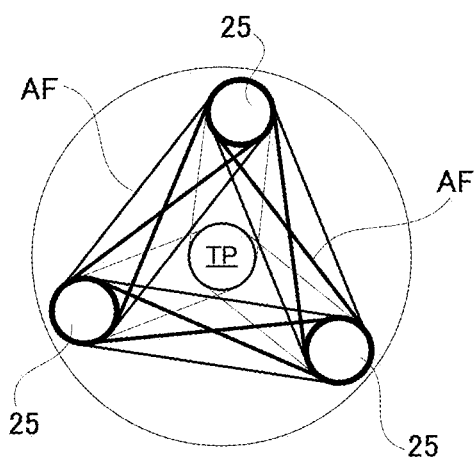

The following describes the artifact reduction effect of the configuration according to the embodiment with reference to FIGS. 5A to 5C. FIG. 5A illustrates an X-ray CT image obtained by using an X-ray CT device according to a comparative example including no pillars 25 and a pattern diagram thereof, FIG. 5B illustrates an X-ray CT image obtained by using an X-ray CT device according to a first conventional example and a pattern diagram thereof, and FIG. 5C illustrates an X-ray CT image obtained by using an X-ray CT device according to the embodiment and a pattern diagram thereof. In each of FIGS. 5A to 5C, the actually obtained X-ray CT image is illustrated on the left side, and a pattern diagram of the position of an artifact AF occurring in the X-ray CT image is illustrated on the right side.

In the comparative example illustrated in FIG. 5A, since no pillars 25 are disposed on the material testing machine 10, the X-ray 4 does not attenuate due to transmission through the pillars 25 at an optional image capturing angle to the test piece TP. Thus, almost no artifact AF occurs to the CT image of the test piece TP in the X-ray CT image. However, the material testing machine 10 is likely to deform due to a load on the test piece TP since no pillars 25 are provided in the comparative example. Thus, the magnitude of the load applied to the test piece TP has a small upper limit, and the material testing machine 10 has largely reduced durability.

In the first conventional example illustrated in FIG. 5B, the pillars 25 are disposed on the right and left sides of the test piece TP. In an X-ray CT image obtained in this case, a large number of thick linear artifacts AF overlap the CT image of the test piece TP (refer to the right diagram in FIG. 5B). Since a large number of artifacts AF overlap the test piece TP as an observation target, the accuracy of three-dimensional observation performed by using the X-ray CT image largely decreases.

Figure 13A:
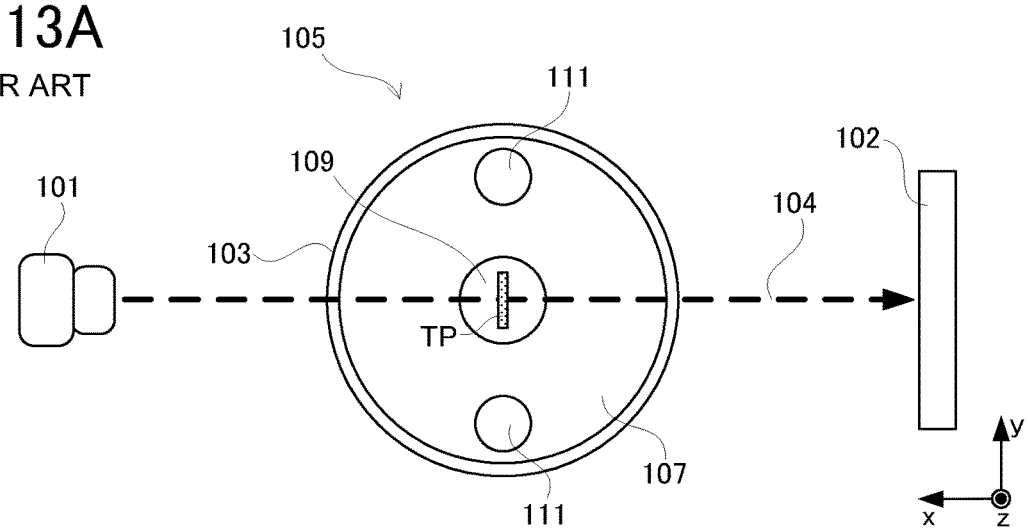
FIGS. 13A, 13B, and 13C are transverse sectional views illustrating problems of the material testing machine according to the conventional example.
Figure 13B:
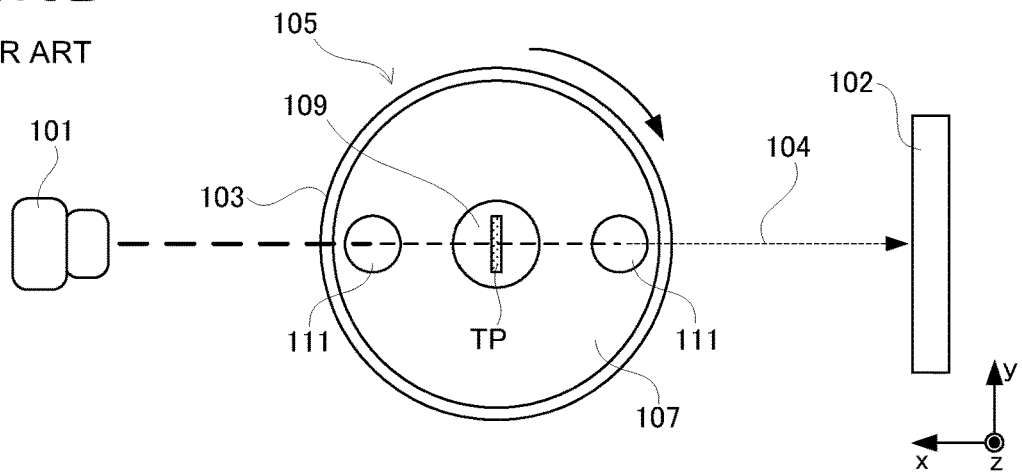
Figure 13C:
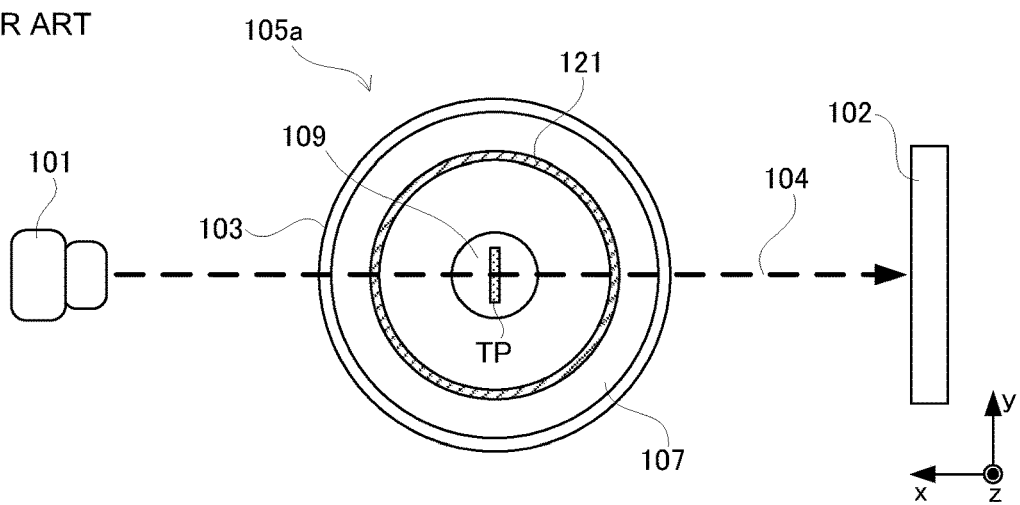

As a result of intensive studies, the inventor has reached the configuration of the pillars 25 as a cause of overlapping of a large number of artifacts AF with the CT image of the test piece TP in the first conventional example. Specifically, when two pillars 25 are disposed on the right and left sides of the test piece TP, the X-ray 4 transmitting through the test piece TP does not receive the X-ray attenuation effect due to the pillars 25, or the X-ray 4 transmits through the two pillars 25 and largely attenuates, depending on the image capturing angle of the test piece TP (refer to FIGS. 13A and 13B).

Thus, in the first conventional example, the X-ray CT image is reconstructed by using a group of X-ray image data obtained for an image capturing angle at which the X-ray 4 does not transmit through the pillars 25 and hardly attenuates and a group of X-ray image data obtained for an image capturing angle at which the X-ray 4 transmits through the two pillars 25 and attenuates at a high attenuation rate. As a result, thick linear artifacts AF overlap the CT image of the test piece TP in the X-ray CT image.

Thus, through further studies, the inventor has reached the material testing machine 10 according to the embodiment as a configuration capable of performing highly accurate three-dimensional observation. In the embodiment illustrated in FIG. 5C, each pillar 25 is disposed at a position corresponding to an apex of a regular triangle centered at the test piece TP, and the X-ray 4 transmitting through the test piece TP transmits through at most one pillar 25 at X-ray CT image capturing. In this embodiment, the X-ray CT image is reconstructed by using the group of X-ray image data obtained for the image capturing angle at which the X-ray 4 does not transmit the pillars 25 and hardly attenuates and the group of X-ray image data obtained for the image capturing angle at which the X-ray 4 transmits through one pillar 25 and attenuates at a low attenuation rate.

Thick linear artifacts AF occurs in the X-ray CT image obtained by X-ray CT image capturing using the material testing machine 10 according to the embodiment (refer to the left diagram in FIG. 5C). However, any thick linear artifacts AF occur outside the test piece TP and do not overlap the CT image of the test piece TP (refer to the right diagram in FIG. 5C).

Thus, the quality of the X-ray CT image can be prevented from decreasing due to overlapping of the artifacts AF with the observation target. Accordingly, the X-ray CT image at a higher quality can be used to perform highly accurate three-dimensional observation of the test piece TP under load application.

Figure 6A:
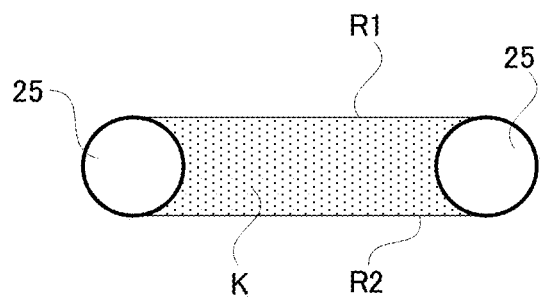
FIGS. 6A, 6B, and 6C are schematic views illustrating the configuration of the material testing machine according to the embodiment.

The following describes a preferable configuration of the material testing machine 10 according to the embodiment, focusing on a range in which thick linear artifacts AF occur in the X-ray CT image. Specifically, as illustrated in FIG. 6A, a region K through which a straight line connecting two pillars 25 passes corresponds to the range in which thick linear artifacts AF occur in the X-ray CT image. In other words, the region K illustrated with halftone dots corresponds to a region surrounded by two pillars 25 and common tangent lines R1 and R2 of the pillars 25.

Figure 6B:
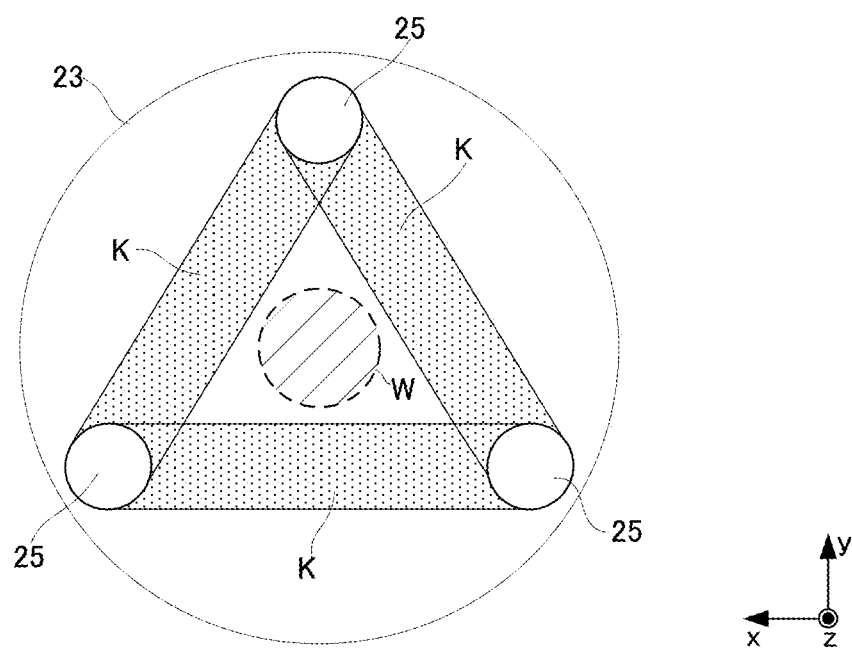

Thus, in the embodiment in which the three pillars 25 are disposed in a regular triangular shape, it is possible to reliably avoid overlapping between the CT image of the test piece TP and the artifact AF when the three regions K each formed by selected two of the three pillars 25 constantly do not pass through the test piece TP (FIG. 6B). In other words, the X-ray 4 transmitting through the test piece TP reliably transmits through zero or one pillar 25 when the CT image capturing region W as a region through which the test piece TP passes as the rotation table 7 is rotated to perform X-ray CT image capturing does not overlap the region K. When the region K does not overlap the CT image capturing region W, an optional straight line passing through the CT image capturing region W does not intersect two or more pillars 25. Thus, when the region K does not overlap the CT image capturing region W, the number of pillars 25 through which the X-ray 4 transmitting through the test piece TP transmits at X-ray CT image capturing is zero or one.

Figure 6C:
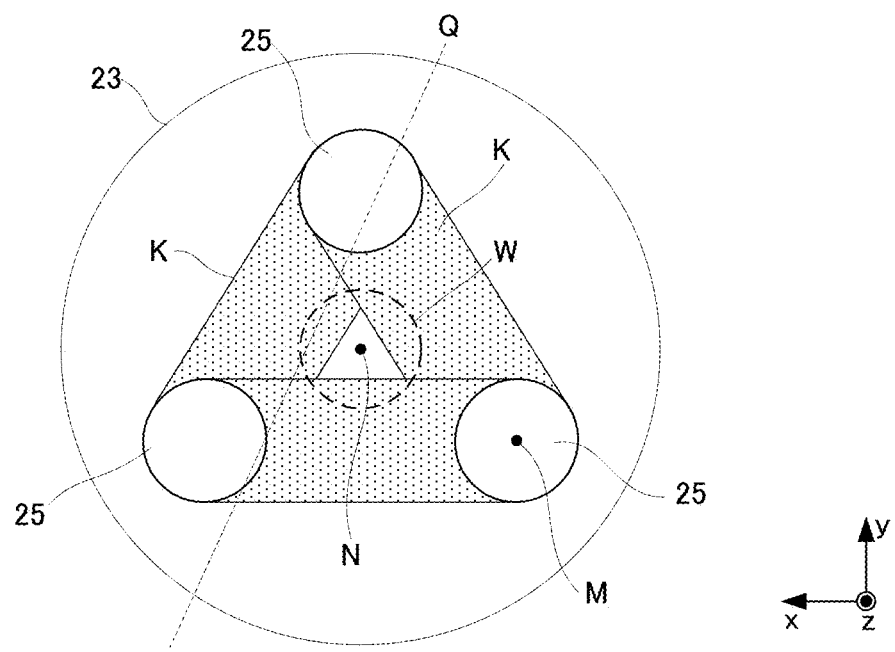

As illustrated in FIG. 6C, when the region K overlaps the CT image capturing region W, a straight line passing through the CT image capturing region W can intersect two or more pillars 25. For example, a straight line Q intersects each of the CT image capturing region W and the two pillars 25. Thus, in the configuration as illustrated in FIG. 6C, the X-ray 4 transmits through two pillars and largely attenuates in some image capturing direction at X-ray CT image capturing. As a result, an artifact overlaps the X-ray CT image of the test piece TP because of difference in the attenuation rate of the X-ray 4 due to difference in the image capturing direction. The region K overlaps the CT image capturing region W when the distance S1 between the center N of the grips 29 and the center M of each pillar 25 is too short or when the radius S2 of each pillar 25 is too long.

Figure 7:
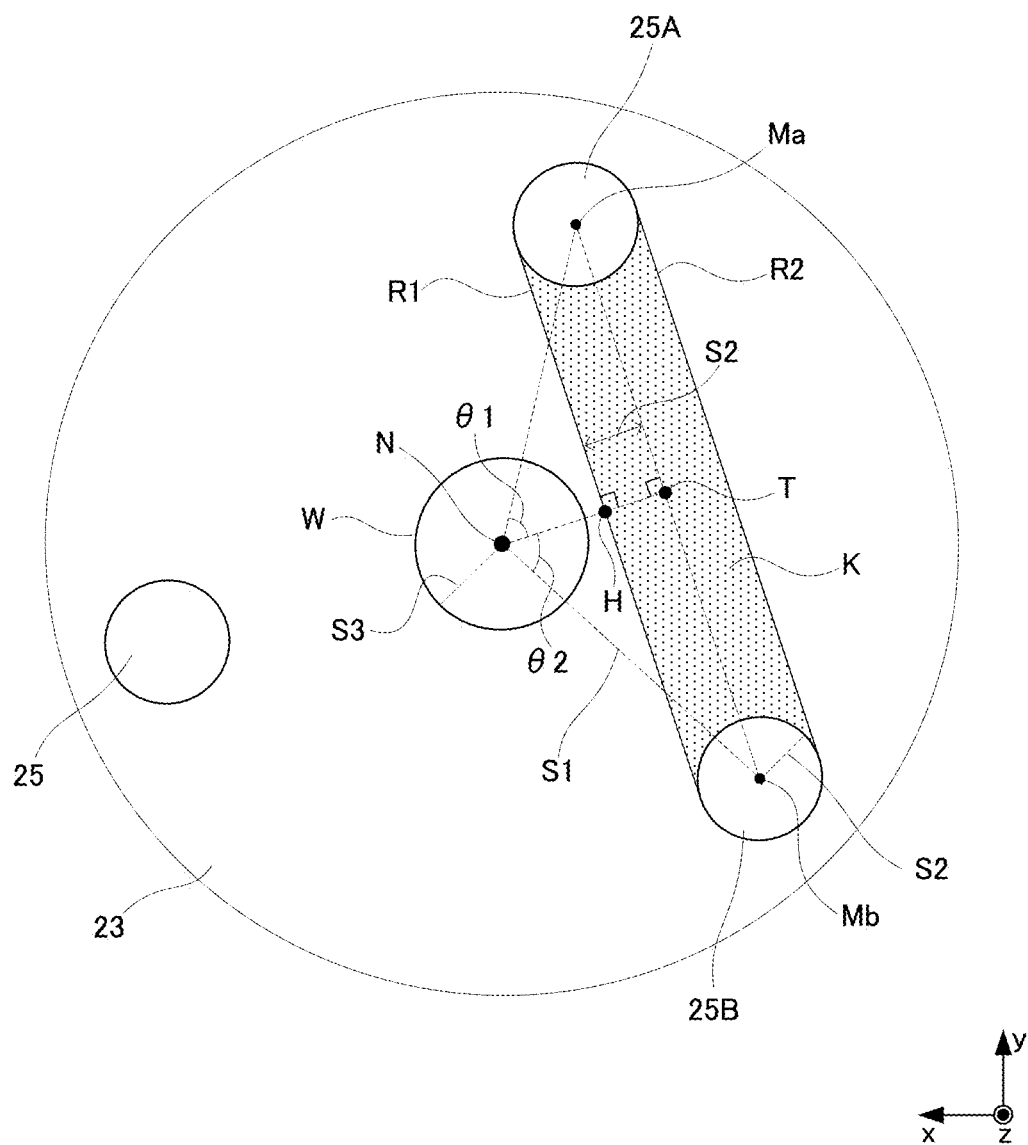
FIG. 7 is a diagram for description of conditions satisfied by pillars and the CT image capturing region in the material testing machine according to the embodiment.

The following describes, with reference to FIG. 7, conditions on the distance S1 between the center N of the grips 29 and the center M of each pillar 25, the radius S2 of each pillar 25, and the radius S3 of the CT image capturing region W under which the CT image capturing region W does not overlap the region K. Since the material testing machine 10 rotates about the grips 29, the center of the CT image capturing region W coincides with the center N of the grips 29. Optionally selected two of the three pillars 25 are denoted by 25a and 25b, and the centers of the pillars 25a and 25b are denoted by Ma and Mb, respectively. A point at which a straight line MaMb connecting the centers Ma and Mb orthogonally intersects a straight line passing through the center N of the CT image capturing region W is denoted by T.

When one of common tangent lines of the pillars 25a and 25b, which is close to the CT image capturing region W is referred to as a common tangent line R1, a straight line NT orthogonally intersects the common tangent line R1 at a point H. A length V of a straight line NH is a shortest distance from the center N of the CT image capturing region W to the region K. In other words, when the length V of the straight line NH is longer than the radius S3 of the CT image capturing region W, the region K does not overlap the CT image capturing region W, and thus an artifact AF does not overlap the CT image of the test piece TP.

The three pillars 25 are disposed at apexes of a regular triangle centered at a point N, and thus the angle between a straight line NMa and a straight line NMb is 120°. Accordingly, an angle θ1 between the straight line NMa and the straight line NT and an angle θ2 between the straight line NMb and the straight line NT are equal to each other at 60°.

Since the length of the straight line NMa is equal to the length S1, Expression (2) below holds when J represents the length of the straight line NT.

$$J = S1 \cdot (\cos 60°) = S1 \cdot (\tfrac{1}{2}) \tag{2}$$

The length of a straight line TH is equal to the radius S2 of each pillar 25, and thus the length V of the straight line NH can be obtained through Expression (3) below by using the length J of the straight line NT.

$$V = J - S2 = S1 \cdot (\tfrac{1}{2}) - S2 \tag{3}$$

As described above, when the length V of the straight line NH is equal to or longer than the radius S3 of the CT image capturing region W (V≥S3), the region K does not overlap the CT image capturing region W. Thus, when the values of S1 to S3 satisfies Expression (4) below, the region K does not overlap the CT image capturing region W.

$$V = S1 - (\tfrac{1}{2}) - S2 \geq S3 \tag{4}$$

As a result of arranging Expression (4), Expression (1) described above holds. Specifically, in the embodiment in which three pillars 25 are disposed in a regular triangular shape, the region K does not overlap the CT image capturing region W when the sum of the radius S2 and the radius S3 is equal to or shorter than half of the distance S1. Accordingly, the number of pillars 25 through the X-ray 4 transmitting through the test piece TP transmits in an optional image capturing direction is reliably equal to or smaller than one. As a result, it is possible to reliably avoid a situation in which a linear artifact AF overlaps the CT image of the test piece TP in the X-ray CT image.

Further description will be made on effects obtained by the configuration according to the embodiment. In the material testing machine 10 according to the embodiment, three pillars 25 are erected on the base 23, and a load applied to the test piece TP is supported by the pillars 25 having high stiffness. Thus, in a material test in which a large load is applied on the test piece TP, deformation of the material testing machine 10 is excellently avoided, and the accuracy of the material test is further improved.

In the embodiment, the durability of the material testing machine 10 against a load applied to the test piece TP is increased by the three pillars 25 erected on the base 23.

Thus, the embodiment can solve problems such as complexity of work in a material test and limitation of contents that can be performed in the material test, which occur in a second conventional example.

Specifically, there is a large gap between the pillars 25 in the material testing machine 10 according to the embodiment, and a space in which the test piece TP is attached is in an open state connected to the outside. Thus, work of setting the test piece TP, various sensors, various wires, and the like in a material test, and work of removing the test piece TP and the like after the material test is completed can be fast and easily performed by putting a hand or the like through the gap between the pillars 25. Unlike the second conventional example, work of disassembling and reassembling the material testing machine each time the material test is completed is unnecessary in the embodiment, and thus the complexity of work in the material test can be largely reduced.

In the second conventional example, the test piece TP is blocked by a tubular member 121, and the visibility of the test piece TP decreases. However, in the embodiment, the test piece TP can be clearly visually recognized through the gap between the pillars 25, and thus the state of the test piece TP on which a load is applied can be easily and accurately checked. Accordingly, the test can be reliably and promptly stopped and dealt with when error occurs in the material test, for example, when the grips 29 fails to hold the test piece TP. Thus, it is possible to excellently prevent time and cost taken for the material test from being nullified.

In addition, since no tubular member is needed in the embodiment, the sizes of the test piece TP and the grips 29 are not restricted by the inner diameter of the tubular member. Thus, it is easier to perform the material test by using the test piece TP having a shape and a size standardized by JIS standard or the like. Thus, it is easy to check consistency by comparing a test result obtained by the material testing machine 10 or the X-ray CT device 1 according to the embodiment with a result of a material test in accordance with the existing standard.

The present invention is not limited to the above-described embodiments but may be modified as follows.

(1) In the above-described embodiment, the three pillars 25 are erected at positions corresponding to apexes of a regular triangle on the base 23. However, the number and disposition of pillars 25 may be changed as appropriate as long as the number of pillars 25 through which the X-ray 4 transmitting through the test piece TP transmits in an optional image capturing direction when X-ray CT image capturing is performed is reliably equal to or smaller than one.

Figure 8A:
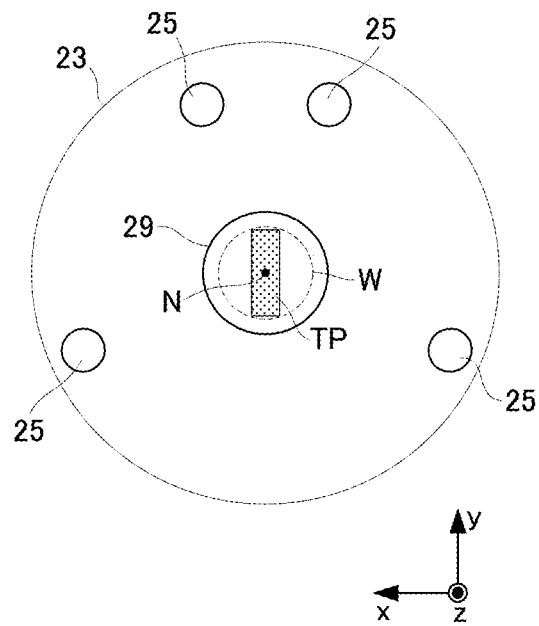
FIGS. 8A, 8B, 8C, and 8D are transverse sectional views illustrating the configuration of the material testing machine according to the embodiment.
Figure 8B:
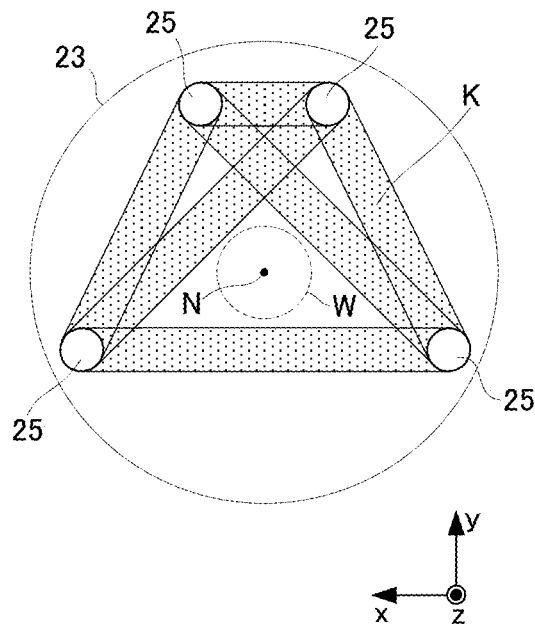

For example, as illustrated in FIG. 8A, four pillars 25 are erected at positions corresponding to apexes of a trapezoid. In this case, a region in which an artifact AF occurs in an X-ray CT image of a surface orthogonal to the z direction, in other words, a region K formed by straight lines passing through optionally selected two of the four pillars 25 is as illustrated in FIG. 8B. Thus, when the CT image capturing region W is set in a range in which the CT image capturing region W does not overlap any region K, the X-ray 4 reliably transmits one or less pillar 25 only, and it is possible to reliably avoid a situation in which the artifact AF overlaps the CT image of the test piece TP.

Figure 8C:
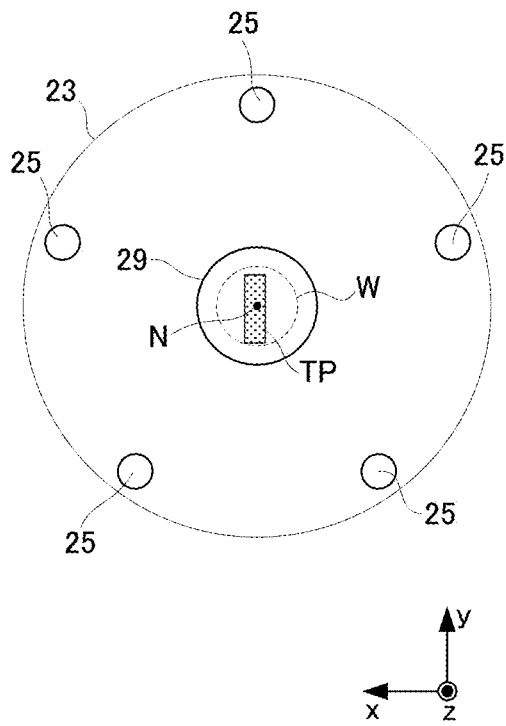

It is preferable that the pillars 25 be disposed to form a regular polygon centered at the center N because a load acting on the test piece TP in a material test can be equally dispersed. For example, as illustrated in FIG. 8C, five pillars 25 are disposed at positions corresponding to apexes of a regular pentagon centered at the center N of the grips 29.

Figure 8D:
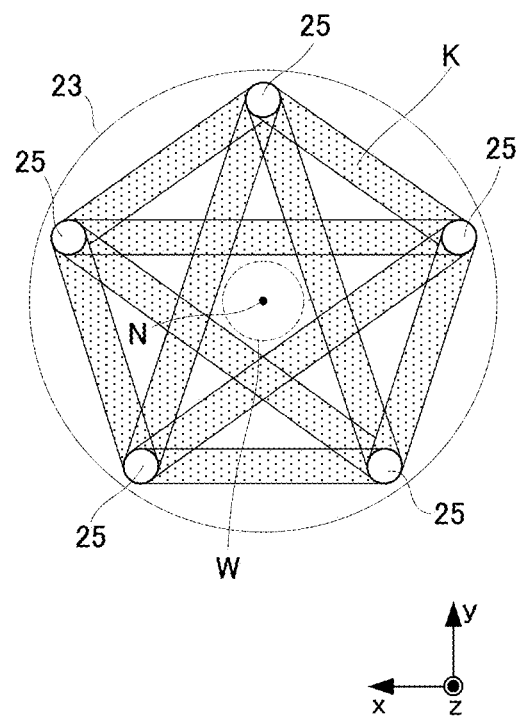

In this case, a region K formed by optionally selected two of the five pillars 25 is as illustrated in FIG. 8D. The number of pillars 25 through the X-ray 4 transmits can be reliably set to be equal to or smaller than one by adjusting the CT image capturing region W and the pillars 25 so that each region K does not overlap the CT image capturing region W.

However, the number of apexes of a regular polygon needs to be an odd number. When the pillars 25 are disposed in a regular polygon having an even number of apexes, such as a square or a regular hexagon, the pillars 25 are disposed at positions bilaterally symmetric across the test piece TP, and thus the X-ray 4 transmits through the two pillars 25 at a predetermined image capturing angle, which is not preferable.

The following describes conditions on the distance S1 between the center N of the grips 29 and the center M of each pillar 25, the radius S2 of each pillar 25, and the radius S3 of the CT image capturing region W in the material testing machine 10 in which an optional odd number n of pillars are disposed at positions corresponding to apexes of a regular n-polygon.

Figure 9A:
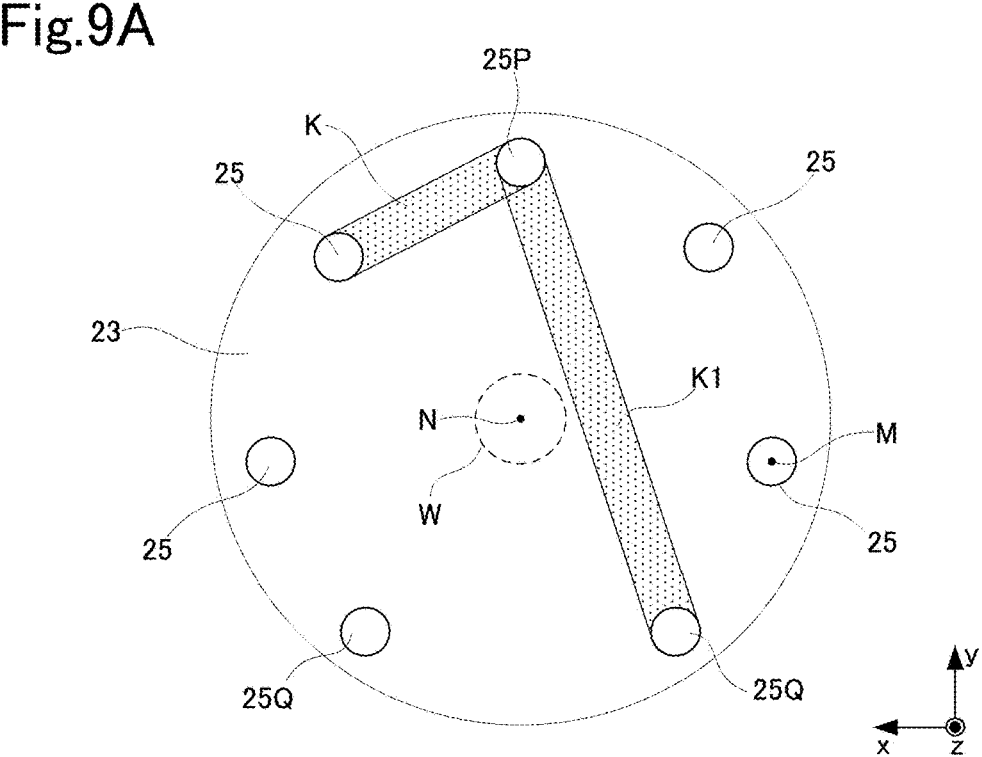
FIGS. 9A and 9B are diagrams for description of conditions satisfied by the pillars and the CT image capturing region in the material testing machine according to a modification.

First, among the n pillars 25, a combination of two pillars 25 with which the region K is closest to the CT image capturing region W will be considered. As illustrated in FIG. 9A, one of the pillars 25 is optionally selected as a pillar 25P. When the pillar 25P is disposed on a central line of the base 23, a region Ka formed by a pillar 25Q at a position farthest from the pillar 25P across the CT image capturing region W and the pillar 25P is closest to the CT image capturing region W in the region K.

The pillar 25Q corresponds to the $\{(n-1)/2\}$-th pillar 25 from the pillar 25P in one of the circumferential directions. In other words, $\{(n-3)/2\}$ pillars 25 are disposed between the pillar 25P and the pillar 25Q. FIG. 9A exemplarily illustrates a configuration in which seven pillars 25 are erected in a regular heptagonal shape (n=7).

Figure 9B:
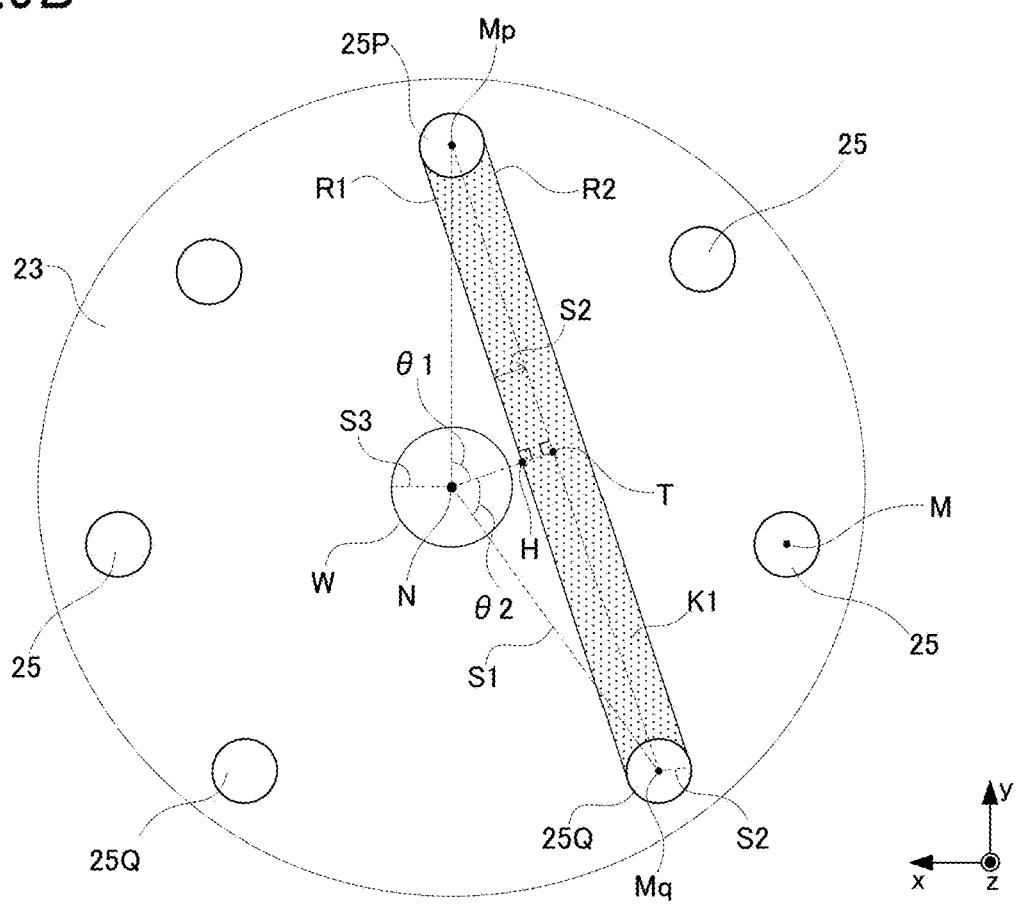

The conditions of S1 to S3 in a regular n-polygon can be calculated by using the method described with reference to FIG. 7. Specifically, as illustrated in FIG. 9B, the center of the pillar 25P and the center of the pillar 25Q are denoted by Mp and Mq, respectively.

First, an angle θ between the straight line NMa and the straight line NMb is calculated. Since a pillar 25B is the $\{(n-1)/2\}$-th pillar 25 from a pillar 25A in a circumferential direction among n pillars 25, the angle θ is calculated by using Expression (5) below. Note that $2\pi=360°$.

$$\theta = 2\pi \cdot (n-1)/2n \quad (5)$$

Thus, the angle θ1 between the straight line NMa and the straight line NT and the angle θ2 between the straight line NMb and the straight line NT are equal to each other and correspond to $\pi \cdot (n-1)/2n$.

Since the length of the straight line NMa is equal to the length S1, Expression (6) below holds where J represents the length of the straight line NT.

$$J = S1 \cdot (\cos \theta 1) = S1 \cdot \cos \{\pi \cdot (n-1)/2n\} \quad (6)$$

The length of the straight line TH is equal to the length of the radius S2 of each pillar 25, and thus the length V of the straight line NH can be obtained through Expression (7) below by using the length J of the straight line NT.

$$V = J - S2 = S1 \cdot \cos \{\pi \cdot (n-1)/2n\} - S2 \quad (7)$$

As described above, when the length V of the straight line NH is equal to or longer than the radius S3 of the CT image capturing region W (V≥S3), the region K does not overlap the CT image capturing region W. Thus, when the values of S1 to S3 satisfy Expression (8) below, the region K does not overlap the CT image capturing region W.

$$V = S1 \cdot \cos \{\pi \cdot (n-1)/2n\} - S2 \geq S3 \quad (8)$$

As a result of arranging Expression (8), Expression (9) below holds.

$$S1 \cdot \cos \{\pi \cdot (n-1)/2n\} \geq S2 + S3 \quad (9)$$

Specifically, when the sum of the radius S2 and the radius S3 is equal to or smaller than the product of the distance S1 and $\cos \{\pi \cdot (n-1)/2n\}$ in the configuration in which the n pillars 25 are disposed in a regular n-polygonal shape, all regions K do not overlap the CT image capturing region W, and the X-ray 4 transmitting through the test piece TP reliably passes through zero or one pillar 25 in an optional image capturing direction.

Since the value of $\cos \{\pi \cdot (n-1)/2n\}$ decreases as the number of pillars 25, in other words, the value of n increases, it is needed to increase the distance S1 or reduce the radii S2 and S3 so that the number of pillars 25 through the X-ray 4 transmits is reliably equal to or smaller than one. Thus, it is particularly preferable that three pillars 25 be disposed in a regular triangular shape as described in the embodiment. When three pillars 25 are disposed in a regular triangular shape, the pillars 25 are disposed close to the center of the base 23, and thus it is possible to achieve downsizing of the material testing machine 10. When the downsizing of the material testing machine 10 is achieved, X-ray image capturing can be performed while the X-ray source 3 is positioned close to the test piece TP. As a result, an X-ray CT image at a higher magnification can be acquired.

(2) Although the above-described embodiment and modification exemplarily describe the material testing machine 10 including the grips 29 and configured to perform a material test of applying a tensile load to the test piece TP, the configuration according to the present invention is also applicable to a material testing machine configured to perform another material test such as a compression test or a bending test. The following exemplarily describes a material testing machine 10A according to a modification having a configuration for performing a bending test. Any component identical to that of the material testing machine 10 according to the embodiment is denoted by an identical reference sign, and any different component will be described in detail.

Figure 10A:
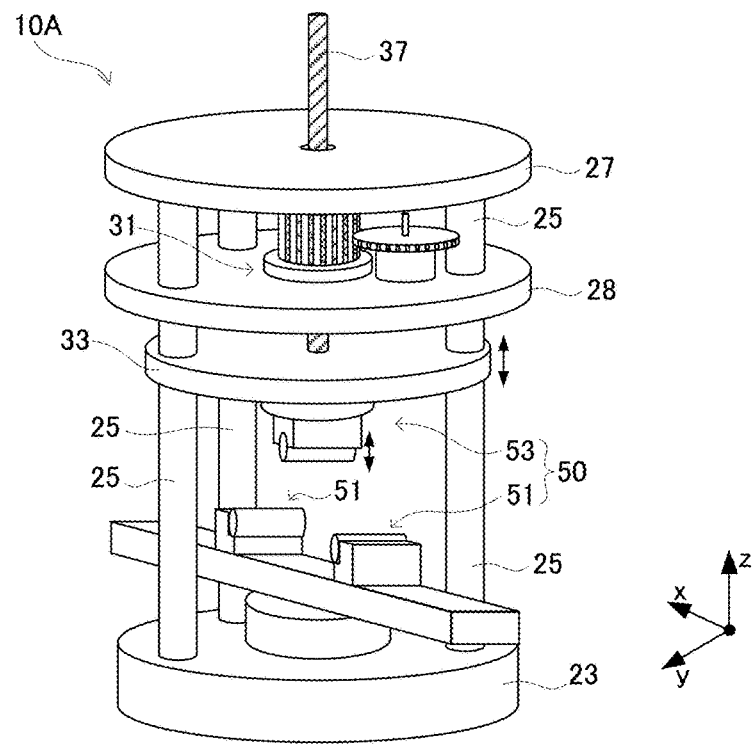
FIGS. 10A, 10B, and 10C are diagrams illustrating the configuration of the material testing machine according to the modification.

As illustrated in FIG. 10A, the material testing machine 10A includes a bending member 50 in place of the pair of grips 29. The bending member 50 includes a supporting table 51 and an indenter 53. The supporting table 51 is disposed at the center of the base 23, and supports the test piece TP. The indenter 53 is disposed at a position opposite to the supporting table 51 across the test piece TP, and applies a bending load to the test piece TP. It is preferable that the supporting table 51 and the indenter 53 be made of a material such as CFRP having high X-ray transmittivity.

Figure 10B:
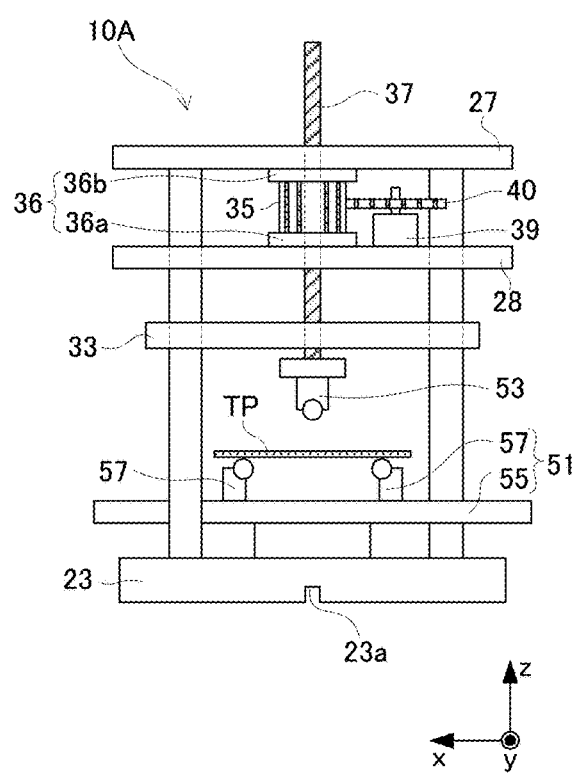

As illustrated in FIG. 10B, the supporting table 51 includes a base part 55 and a support part 57. The base part 55 is connected with the central part of the base 23. The support part 57 is disposed on the upper surface of the base part 55, and a pivot is formed at each leading end thereof. The test piece TP is supported when the test piece TP is placed on the support part 57. The indenter 53 is connected with the lower end of the screw rod 37 like the upper grip 29b in the embodiment, and reciprocally movable in the z direction by the drive mechanism 31. In the present modification, the supporting table 51 corresponds to the first member in the present invention, and the indenter 53 corresponds to the second member in the present invention.

Although FIG. 10A exemplarily illustrates the material testing machine 10A for performing a so-called three-point bending test with two support parts 57 and one indenter 53, the number of support parts 57 and the number of indenters 53 may be changed as appropriate. Similarly to the embodiment, the material testing machine 10A includes three pillars 25 disposed at positions corresponding to apexes of a regular triangle centered at the supporting table 51, but the disposition and number of pillars 25 may be changed as appropriate as long as the X-ray 4 transmitting through the test piece TP does not transmit through two or more pillars 25.

Figure 10C:
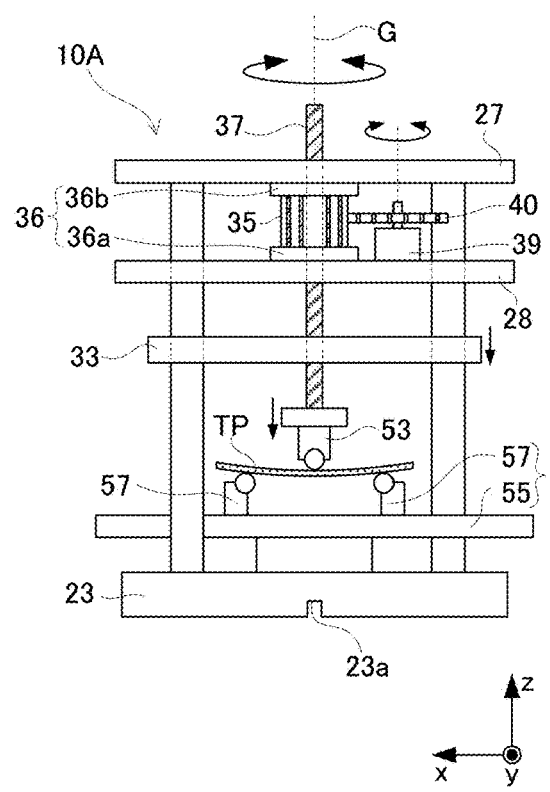
Figure 11:
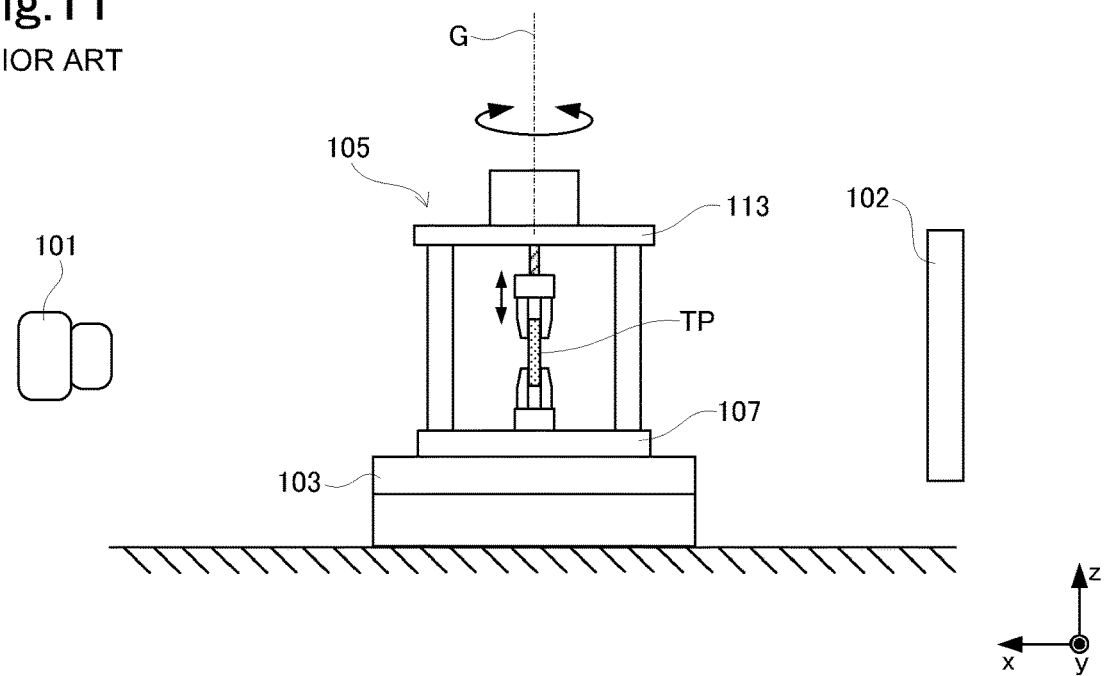
FIG. 11 is a schematic view illustrating the entire configuration of an X-ray CT device including a material testing machine according to a conventional example.
Figure 12A:
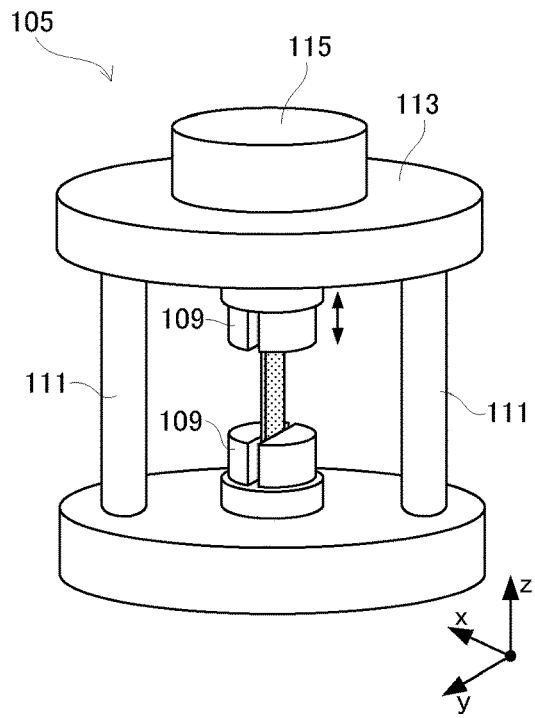
FIGS. 12A and 12B are schematic views illustrating the entire configuration of the material testing machine according to the conventional example.
Figure 12B:
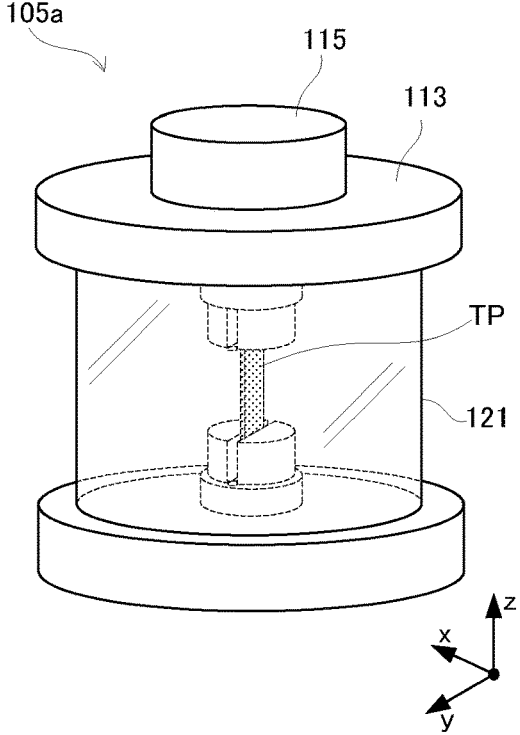

When the bending test is performed by using the material testing machine 10A, the test piece TP is set to the material testing machine 10A by first placing the test piece TP on the supporting table 51. Then, the drive mechanism 31 is actuated to rotate the rotation member 35 by the motor 39. As illustrated in FIG. 10C, as the rotation member 35 rotates, the indenter 53 moves down together with the screw rod 37 and the movable head 33, and the leading end of the indenter 53 presses the test piece TP downward.

When pressed by the indenter 53, the test piece TP receives a predetermined load and is bent downward. While the load is applied on the test piece TP, the rotation table 7 is rotated to rotate the material testing machine 10A about the axis in the z direction, and X-ray is emitted from the X-ray source 3 to acquire an X-ray CT image.

The material testing machine 10A is configured so that the number of pillars 25 through which, among the emitted X-ray, the X-ray 4 transmitting through the test piece TP and detected by the X-ray detector 5 transmits in any image capturing direction to the test piece TP is equal to or smaller than one. Thus, it is possible to prevent a situation in which the X-ray largely attenuates due to transmission through two or more pillars only in a particular image capturing direction when the X-ray CT image is captured. Accordingly, it is possible to avoid an artifact occurring to the X-ray CT image of the test piece TP attributable to variation in X-ray image data due to difference in the image capturing direction. Thus, highly accurate three-dimensional observation can be performed by using the X-ray CT image of the test piece TP.

Similarly to the material testing machine 10, the material testing machine 10A has a structure in which a load is supported by a plurality of pillars 25 erected on the base 23. Specifically, the periphery of the test piece TP is in an open state through the gap between the pillars 25. Thus, as illustrated in FIG. 10B or the like as an example of various members such as the bending member 50, no problem occurs to the material test and the X-ray CT image capturing when the supporting table 51 is longer than the diameter of the base 23. Thus, a so-called four-point bending test or a bending test with a larger number of load acting points can be easily executed by increasing the number of support parts 57 and the number of indenters 53.

Since the periphery of the test piece TP is in the open state, a material having a larger length or a larger thickness can be used as the test piece TP. Thus, it is possible to avoid a situation in which influence of shearing increases through various material tests by using a short material. Since a thick material can be used for the material test, it is possible to perform various material tests by using a laminated material such as CFRP as the test piece TP. Thus, the versatility of the material test can be improved, and the quality of data obtained through the material test can be improved.

(3) In the above-described embodiment and modification, upper members such as the upper grip 29b and the indenter 53 are reciprocally movable, but lower members such as the lower grip 29a and the supporting table 51 may be movable. In this case, various loads such as a compression load, a tensile load, and a bending load are applied to the test piece TP as a lower member corresponding to the first member is driven in the z direction and moves closer to or away from relative to the second member.

(4) In the above-described embodiment and modification, a member disposed at the center of the base 23 may be replaced as appropriate. As an example, when the grips 29 is replaceable with the bending member 50, a material test performed using the material testing machine 10 can be immediately changed from a material test of applying a tensile load to a material test of applying a bending load. As another example, when the indenter 53 is replaced with a needle-shaped member having a sharp lower end in the material testing machine 10A, a material test of applying a piercing load to the test piece TP can be performed.

(5) In the above-described embodiment and modification, an X-ray is emitted to acquire X-ray image data for 360° each time a predetermined minute angle is rotated while the rotation table 7 is rotated by 360° at X-ray CT image capturing, but the CT image capturing is not limited to the rotation through 360°. Specifically, an angle R by which the rotation table 7 is rotated in the CT image capturing may be changed as appropriate as long as the X-ray CT image of the test piece TP suitable for three-dimensional observation can be obtained with the angle. The angle R is preferably 45° or larger, more preferably 180° or larger.

For example, when X-ray CT image capturing is performed as the rotation table 7 is rotated by 180°, X-ray irradiation is repeated while the rotation table 7 is rotated by 180° to acquire the X-ray image data of the test piece TP for 180°. The pillars 25 may be each configured so that the number of pillars 25 through the X-ray 4 transmits is constantly equal to or smaller than one when CT image capturing is performed through the 180° rotation. In other words, the test piece TP is irradiated with X-rays in a plurality of image capturing directions different from each other by 180° at maximum through the rotation of the rotation table 7, but the pillars 25 may be each configured so that the number of pillars 25 through the X-ray 4 transmits in an optional direction among the image capturing direction of 180° is equal to or smaller than one.

(6) In the above-described embodiment and the modification, an X-ray CT device configured to perform detection by irradiating a test piece with an X-ray is exemplarily described as a CT device to which the material testing machine is applied, but the present invention is not limited thereto. Specifically, the material testing machine according to the present invention is also applicable to any CT device and configured to emit other ionizing radiation such as neutron beam, synchrotron radiation, or γ ray and capable of acquiring a CT image of a test piece.

What is claimed is:

1. A radiation CT device comprising:
   a radiation source configured to irradiate a test piece with radiation;
   a radiation detector configured to detect the radiation having transmitted through the test piece and output a radiation detection signal;
   a material testing machine supporting the test piece;
   a rotary stage that is disposed between the radiation source and the radiation detector, and on which the material testing machine supporting the test piece is placed;
   a rotation mechanism configured to rotate the rotary stage;

a controller configured to cause the radiation source to repeat radiation irradiation while the rotary stage is rotated by the rotation mechanism; and a processor configured to reconstruct a radiation CT image of the test piece based on the radiation detection signal output from the radiation detector each time the radiation source performs the radiation irradiation, wherein, the material testing machine comprising:

a base;

a first member disposed at a center of the base and configured to support the test piece;

a second member disposed opposite to the first member across the test piece;

a plurality of pillars erected on the base; and a drive mechanism configured to drive at least one of the first member and the second member in a direction in which a load is applied to the test piece, wherein, when radiation CT image capturing is performed while rotating the rotary stage about an axis orthogonal to a surface of the rotary stage, the plurality of pillars are erected so that a number of the plurality of pillars through which radiation emitted from the radiation source is transmitted and subsequently detected by the radiation detector is one or zero when the test piece is irradiated with radiation from the radiation source in an optional direction.

2. The radiation CT device according to claim 1, wherein each pillar of the plurality of pillars is erected at a position corresponding to an apex of a regular polygon having an odd number of apexes and centered at the first member.

3. The radiation CT device according to claim 2, wherein $$S1 \cdot \cos\{\pi \cdot (n-1)/2n\} \geq S2 + S3$$

holds, where n represents a number of the plurality of pillars, S1 represents a distance between a center of each pillar of the plurality of pillars and a center of the first member, S2 represents a radius of each pillar of the plurality of pillars, and S3 represents a maximum distance between a center of the first member and the test piece.

4. The radiation CT device according to claim 2, wherein each pillar of the plurality of pillars is erected at a position corresponding to an apex of a regular triangle centered at the first member.

5. The radiation CT device according to claim 4, wherein $$S1 \cdot (\tfrac{1}{2}) \geq S2 + S3$$

holds, where S1 represents a distance between a center of each pillar of the plurality of pillars and a center of the first member, S2 represents a radius of each pillar of the plurality of pillars, and S3 represents a maximum distance between a center of the first member and the test piece.

6. A material testing machine comprising:

a base;

a first member disposed at a center of the base and configured to support a test piece;

a second member disposed opposite to the first member across the test piece;

a plurality of pillars erected on the base; and a drive mechanism configured to drive at least one of the first member and the second member in a direction in which a load is applied to the test piece, wherein the plurality of pillars are erected so that a region formed by each straight line of straight lines passing through optional two pillars of the plurality of pillars does not overlap the test piece.

7. The material testing machine according to claim 6, wherein each pillar of the plurality of pillars is erected at a position corresponding to an apex of a regular polygon having an odd number of apexes and centered at the first member.

8. The material testing machine according to claim 7, wherein $$S1 \cdot \cos\{\pi \cdot (n-1)/2n\} \geq S2 + S3$$

holds, where n represents a number of the plurality of pillars, S1 represents a distance between a center of each pillar of the plurality of pillars and a center of the first member, S2 represents a radius of each pillar of the plurality of pillars, and S3 represents a maximum distance between a center of the first member and the test piece.

9. The material testing machine according to claim 7, wherein each pillar of the plurality of pillars is erected at a position corresponding to an apex of a regular triangle centered at the first member.

10. The material testing machine according to claim 9, wherein $$S1 \cdot (\tfrac{1}{2}) \geq S2 + S3$$

holds, where S1 represents a distance between a center of each pillar of the plurality of pillars and a center of the first member, S2 represents a radius of each pillar of the plurality of pillars, and S3 represents a maximum distance between the center of a first member and the test piece.

11. A radiation CT device comprising:

a material testing machine according to claim 6;

a radiation source configured to irradiate a test piece with radiation;

a radiation detector configured to detect the radiation having transmitted through the test piece and Output a radiation detection signal;

a rotary stage that is disposed between the radiation source and the radiation detector, and on which the material testing machine supporting the test piece is placed;

a rotation mechanism configured to rotate the rotary stage;

a controller configured to cause the radiation source to repeat radiation irradiation while the rotary stage is rotated by the rotation mechanism; and a processor configured to reconstruct a radiation CT image of the test piece based on the radiation detection signal output from the radiation detector each time the radiation source performs the radiation irradiation.

* * * * *